United States Patent
Wang

(10) Patent No.: US 7,861,121 B2
(45) Date of Patent: *Dec. 28, 2010

(54) METHOD AND SYSTEM FOR MONITORING AND VERIFYING SOFTWARE DRIVERS

(75) Inventor: Landy Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1216 days.

This patent is subject to a terminal disclaimer.

(21) Appl. No.: 11/479,268

(22) Filed: Jun. 30, 2006

(65) Prior Publication Data

US 2006/0248542 A1    Nov. 2, 2006

Related U.S. Application Data

(63) Continuation of application No. 09/447,501, filed on Nov. 23, 1999, now Pat. No. 7,111,307.

(51) Int. Cl.
G06F 11/00 (2006.01)
G06F 3/00 (2006.01)

(52) U.S. Cl. .......................... 714/41; 714/25; 714/47; 714/48; 719/327

(58) Field of Classification Search .................. 703/22; 711/170; 714/25, 38, 41, 47, 48; 717/126, 717/127, 135; 719/327
See application file for complete search history.

(56) References Cited

U.S. PATENT DOCUMENTS

| | | | |
|---|---|---|---|
| 4,999,838 A | 3/1991 | Horikawa | |
| 5,043,871 A | 8/1991 | Nishigaki | |
| 5,111,384 A | 5/1992 | Aslanian | |
| 5,117,350 A * | 5/1992 | Parrish et al. ................. | 711/1 |
| 5,355,469 A | 10/1994 | Sparks et al. ................. | 714/38 |
| 5,390,324 A | 2/1995 | Bruckhartt | |
| 5,485,573 A | 1/1996 | Tandon | |

(Continued)

FOREIGN PATENT DOCUMENTS

WO    WO 95/52104    8/1995

OTHER PUBLICATIONS

Windows 2000 Beta 3 "Using Driver Verifier to Expose Driver Errors" Mar. 17, 1999 Window 2000 Beta 3 RCI pp. 1-8.*

(Continued)

Primary Examiner—Van H Nguyen
Assistant Examiner—Charles E Anya
(74) Attorney, Agent, or Firm—Workman Nydegger

(57) ABSTRACT

A method and system for verifying computer system drivers such as kernel mode drivers. A driver verifier sets up tests for specified drivers and monitors the driver's behavior for selected violations that cause system crashes. In one test, the driver verifier allocates a driver's memory pool allocations from a special pool bounded by inaccessible memory space to test for the driver's accessing memory outside of the allocation. The driver verifier also marks the space as inaccessible when it is deallocated, detecting a driver that accesses deallocated space. The driver verifier may also provide extreme memory pressure on a specific driver, or randomly fail requests for pool memory. The driver verifier also checks call parameters for violations, performs checks to ensure a driver cleans up timers when deallocating memory and cleans up memory and other resources when unloaded. An I/O verifier is also described for verifying drivers use of I/O request packets.

19 Claims, 16 Drawing Sheets

U.S. PATENT DOCUMENTS

| | | | |
|---|---|---|---|
| 5,491,808 A * | 2/1996 | Geist, Jr. .................... 711/100 |
| 5,495,571 A * | 2/1996 | Corrie et al. ................. 714/38 |
| 5,590,329 A | 12/1996 | Goodnow |
| 5,598,577 A | 1/1997 | Overfield |
| 5,689,707 A | 11/1997 | Donnelly |
| 5,790,777 A | 8/1998 | Izuta |
| 5,819,024 A | 10/1998 | Kasuga |
| 5,948,112 A | 9/1999 | Shimada |
| 5,949,972 A | 9/1999 | Applegate |
| 5,999,933 A | 12/1999 | Mehta |
| 6,047,124 A | 4/2000 | Marsland ................... 717/128 |
| 6,070,254 A | 5/2000 | Pratt |
| 6,101,617 A | 8/2000 | Bruckhartt |
| 6,163,858 A | 12/2000 | Bodamer |
| 6,170,067 B1 | 1/2001 | Liu |
| 6,178,528 B1 | 1/2001 | Poisner |
| 6,226,761 B1 | 5/2001 | Berstis |
| 6,243,833 B1 * | 6/2001 | Hitchcock et al. ............ 714/33 |
| 6,279,120 B1 | 8/2001 | Lautenbach-Lampe |
| 6,311,327 B1 | 10/2001 | O'Brien |
| 6,360,233 B1 * | 3/2002 | Houldsworth .................... 1/1 |
| 6,363,467 B1 | 3/2002 | Weeks |
| 6,393,560 B1 | 5/2002 | Merrill |
| 6,430,665 B1 | 8/2002 | Allison et al. ................ 711/172 |
| 6,430,707 B1 | 8/2002 | Matthews |
| 6,457,112 B2 | 9/2002 | Hostetter |
| 6,543,010 B1 | 4/2003 | Gaudet |
| 6,618,824 B1 | 9/2003 | Hastings |
| 6,728,907 B1 | 4/2004 | Wang |
| 6,948,099 B1 | 9/2005 | Tallam |
| 6,971,048 B1 * | 11/2005 | Hanson et al. ................ 714/41 |
| 7,127,642 B2 | 10/2006 | Wang |
| 2007/0168739 A1 | 7/2007 | Wang |

OTHER PUBLICATIONS

Office Action dated Sep. 19, 2007 cited in related U.S. Appl. No. 11/549,073.

Notice of Allowance dated May 1, 2008 cited in related U.S. Appl. No. 1/549,073.

Using Driver Verifier to Expose Driver Errors, Mar. 17, 1999, www.microsoft.com/hwdev/driver/driververify.htm.

* cited by examiner

METHOD AND SYSTEM FOR MONITORING AND VERIFYING SOFTWARE DRIVERS

CROSS-REFERENCE TO RELATED APPLICATION

This application is a continuation of U.S. patent application Ser. No. 09/447,501, filed Nov. 23, 1999 now U.S. Pat. No. 7,111,307,B1, which is hereby incorporated by reference.

FIELD OF THE INVENTION

The invention relates generally to computer systems, and more particularly to an improved method and system for monitoring and verifying software components such as kernel-mode drivers.

BACKGROUND OF THE INVENTION

In contemporary operating systems such as Microsoft Corporation's Windows® 2000, low-level (i.e., kernel mode) components including drivers and the operating system itself, handle critical system operations. At the same time, for performance and architectural reasons, drivers typically load in an environment where any driver memory is accessible by any other driver. Furthermore, performance requirements keep operating system overhead to a minimum. Consequently, such components are highly privileged in the operations that they are allowed to perform, and moreover, do not have the same protection mechanisms as higher level (i.e., user mode) components. As a result, even the slightest error in a kernel component can corrupt the system and cause a system crash.

Determining the cause of a system crash so that an appropriate fix may be made has heretofore been a difficult, labor-intensive and somewhat unpredictable task, particularly since the actual component responsible for corrupting the system often appears to be substantially unrelated to the problem. For example, one way in which a kernel component can cause a system crash is related to the way in which pooled memory is arranged and used. For many reasons, including performance and efficiency, pooled memory is allocated by the system kernel as a block, (e.g., in multiples of thirty-two bytes), with a header (e.g., eight bytes) at the start of each block. For example, if forty-four bytes of pooled memory are required by a driver, sixty-four are allocated by the kernel, eight for the header, forty-four for the driver, with the remaining twelve unused. Among other information, the header includes information that tracks the block size. Then, when the memory is deallocated, the kernel looks to see if this block may be coalesced with any adjacent deallocated blocks, so that larger blocks of memory become available for future requests. If so, the header information including the block size is used to coalesce the adjacent blocks.

However, while this mechanism is highly efficient in satisfying requests for memory allocations and then recombining deallocated memory, if an errant kernel component writes beyond its allocated memory block, it overwrites the header of the subsequent block. For example, if a driver requests twenty-four bytes, it will receive one thirty-two byte block, eight for the header followed by the requested twenty-four bytes. However, if the driver writes past the twenty-fourth byte, the driver will corrupt the next header, whereby the kernel may, for example, later coalesce the next block with an adjacent block even though the next block may be allocated to another kernel component. As can be appreciated, other types of errors may result from the corrupted header. In any event, the kernel or the component having the next block allocated to it (or even an entirely different component) will likely appear responsible for the crash, particularly if the problem caused by the errant driver in overwriting the header does not materialize until long after the errant driver has deallocated its memory block.

Another way in which an errant driver may crash the system is when a driver frees pooled memory allocated thereto, but then later writes to it after the memory has been reallocated to another component, corrupting the other component's information. This may lead to a crash in which the other component appears responsible. Indeed, this post-deallocation writing can be a very subtle error, such as if the erroneous write occurs long after the initial deallocation, possibly after many other components have successfully used the same memory location. Note that such a post-deallocation write may also overwrite a header of another block of pooled memory, e.g., when smaller blocks are later allocated from a deallocated larger block.

Yet another type of error that a kernel component may make is failing to deallocate memory that the component no longer needs, often referred to as a "memory leak." This can occur, for example, when a driver unloads but still has memory allocated thereto, or even when a driver is loaded but for some reason does not deallocate unneeded memory. Note that this can occur because of the many complex rules drivers need to follow in order to safely interact with other drivers and operating system components. For example, if two related components are relying on each other to deallocate the space, but neither component actually does deallocate it, a memory leak results. Memory leaks can be difficult to detect, as they slowly degrade machine performance until an out-of-memory error occurs.

Other kernel component errors involve lists of resources maintained by the kernel to facilitate driver operations, and the failure of the driver to properly delete its listed information when no longer needed. For example, a driver may request that the kernel keep timers for regularly generating events therefor, or create lookaside lists, which are fixed-sized blocks of pooled memory that can be used by a driver without the overhead of searching the pool for a matching size block, and thus are fast and efficient for repeated use. A driver may also fail to delete pending deferred procedure calls (DPCs), worker threads, queues and other resources that will cause problems when the driver unloads. Moreover, even when still loaded, the driver should delete items when no longer needed, e.g., a timer maintained by the kernel for a driver may cause a write to a block of memory no longer allocated to the driver. Other errors include drivers incorrectly specifying the interrupt request level (IRQL) for a requested operation, and spinlock errors, i.e., errors related to a mechanism via which only one processor in a multi-processor system can operate at a time, while a driver in control of the spinlock uses the operational processor to execute a critical section of code that cannot be interrupted.

Further complicating detection of the above errors, and identification of their source, is that the errors are often difficult to reproduce. For example, a driver may have a bug that does not arise unless memory is low, and then possibly only intermittently, whereby a test system will not reproduce the error because it does not reproduce the conditions.

In sum, kernel components such as drivers need to be privileged, which makes even slight errors therein capable of crashing the system, yet such errors are often difficult to detect, difficult to match to the source of the problem and/or difficult to reproduce.

SUMMARY OF THE INVENTION

Briefly, the present invention provides a method and system that enables monitoring of user-specified kernel mode components, to watch for select errors committed thereby. To this end, a kernel mode component such as a driver is identified to the kernel at the time the driver is loaded, along with information identifying the type or types of errors for which the driver is to be monitored. Calls by the identified driver to the kernel are re-vectored to a driver verifier component in the kernel, and the driver verifier component takes actions to monitor the driver based on the type or types of monitoring selected for that driver.

Actions that may be taken by the driver verifier include satisfying driver memory pool allocation requests from a special pool that is isolated and bounded by no access permissions. This ascertains whether a driver allocates a certain number of bytes and accesses bytes outside of that allocation. When a driver deallocates space, the space is marked as "No Access" to detect drivers that later access the deallocated space. Also, pool being freed is examined to ensure that no pending timers are inside the pool allocation.

The driver verifier may also be enabled to track a driver's use of pooled memory. To this end, the driver verifier maintains data structures that record information about each allocation, appropriately updating the information as memory is allocated and deallocated. When the driver is unloaded, the driver verifier checks that the driver's space is all deallocated, otherwise a memory leak is detected. Driver unload checking also detects drivers that unload without deleting kernel resources including lookaside lists, pending deferred procedure calls (DPCs), worker threads, queues, timers and other resources.

The driver verifier may also be enabled to simulate low resource conditions. One way to simulate low resource conditions is to provide extreme memory pressure on a specific driver, without affecting other drivers, and regardless of system memory size. This is accomplished by instructing memory management to invalidate the driver's pageable code and data, as well as system paged pool, code and data. This catches drivers that incorrectly hold spinlocks or raise the interrupt request level, and then access paged code or data. Another way in which the driver verifier may simulate low resource conditions to force driver errors is by randomly failing requests from the driver for pooled memory, thereby determining whether a driver can handle this low memory situation.

Further, the driver verifier validates the parameters of a kernel function call, whereby errors in spinlock, IRQL and pool allocation calls are detected. Input/Output (I/O) verification may also be selectively enabled.

Other advantages will become apparent from the following detailed description when taken in conjunction with the drawings, in which:

DETAILED DESCRIPTION OF THE PREFERRED EMBODIMENT

Exemplary Operating Environment

Figure 1:
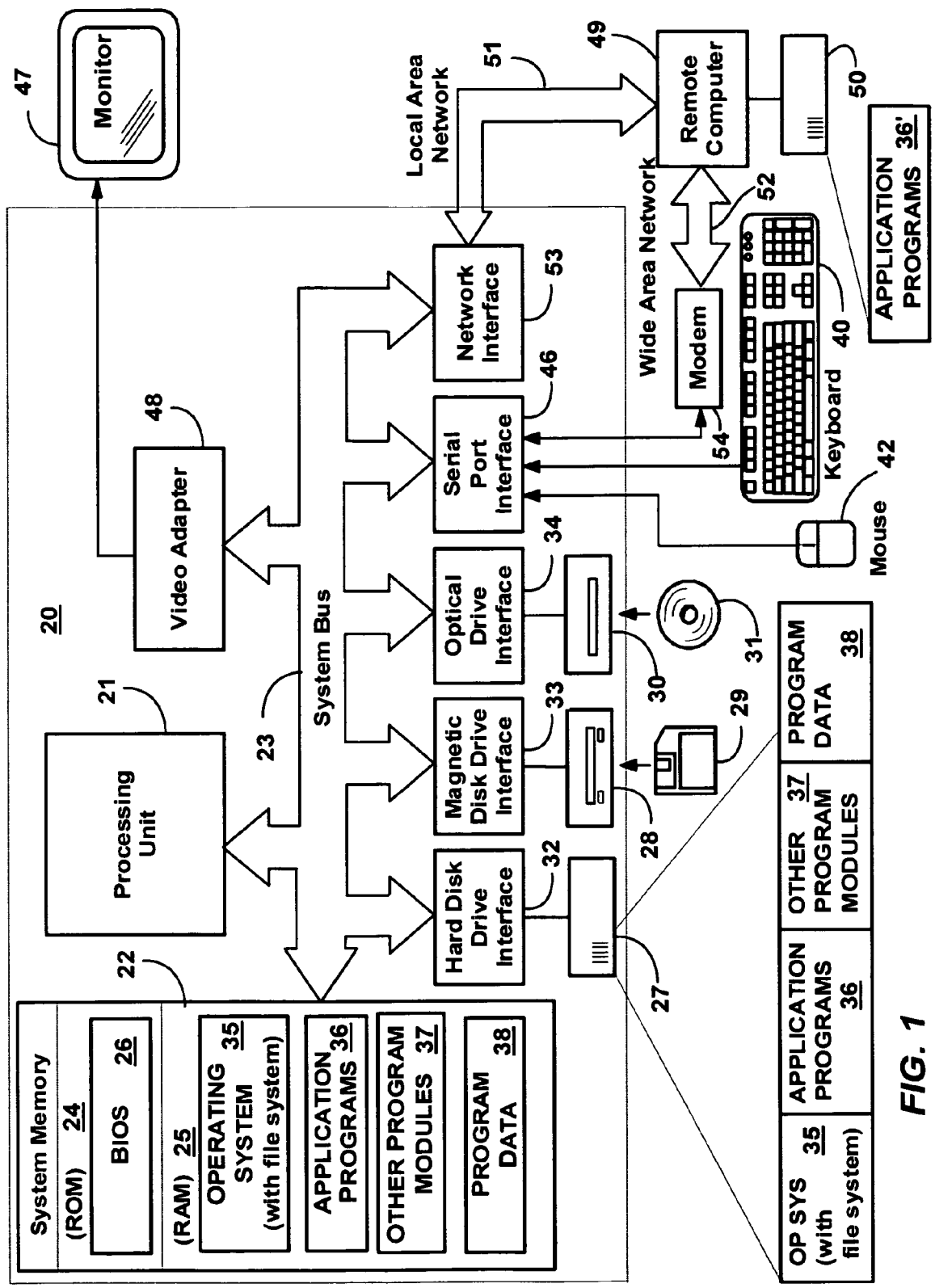
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Note that the present invention is described herein with respect to the Windows® 2000 (formerly Windows® NT®) operating system. However, as can be readily appreciated, the present invention is not limited to any particular operating system, but rather may be used with any operating system, and moreover, has many uses in general computing.

Driver Verification

As will be understood, the present invention is primarily directed to the selective monitoring of drivers for detecting certain types of errors therein, thereby ultimately verifying (to a substantial probability) that a driver makes none of the errors for which tests are performed. Thus, for purposes of simplicity, the component (or components) being monitored for verification will ordinarily be described as a "driver" (or "drivers"). Nevertheless, it should be understood that the present invention is capable of monitoring of other components, including the kernel itself, and as described below, may be extended via APIs or the like to other components to provide verification functionality for their subcomponents that do not directly call the kernel. Moreover, as will be understood, the present invention is extensible in another way, in that as additional tests for drivers are developed, those tests may be added to the present architecture that enables the selective monitoring of drivers.

Figure 2:
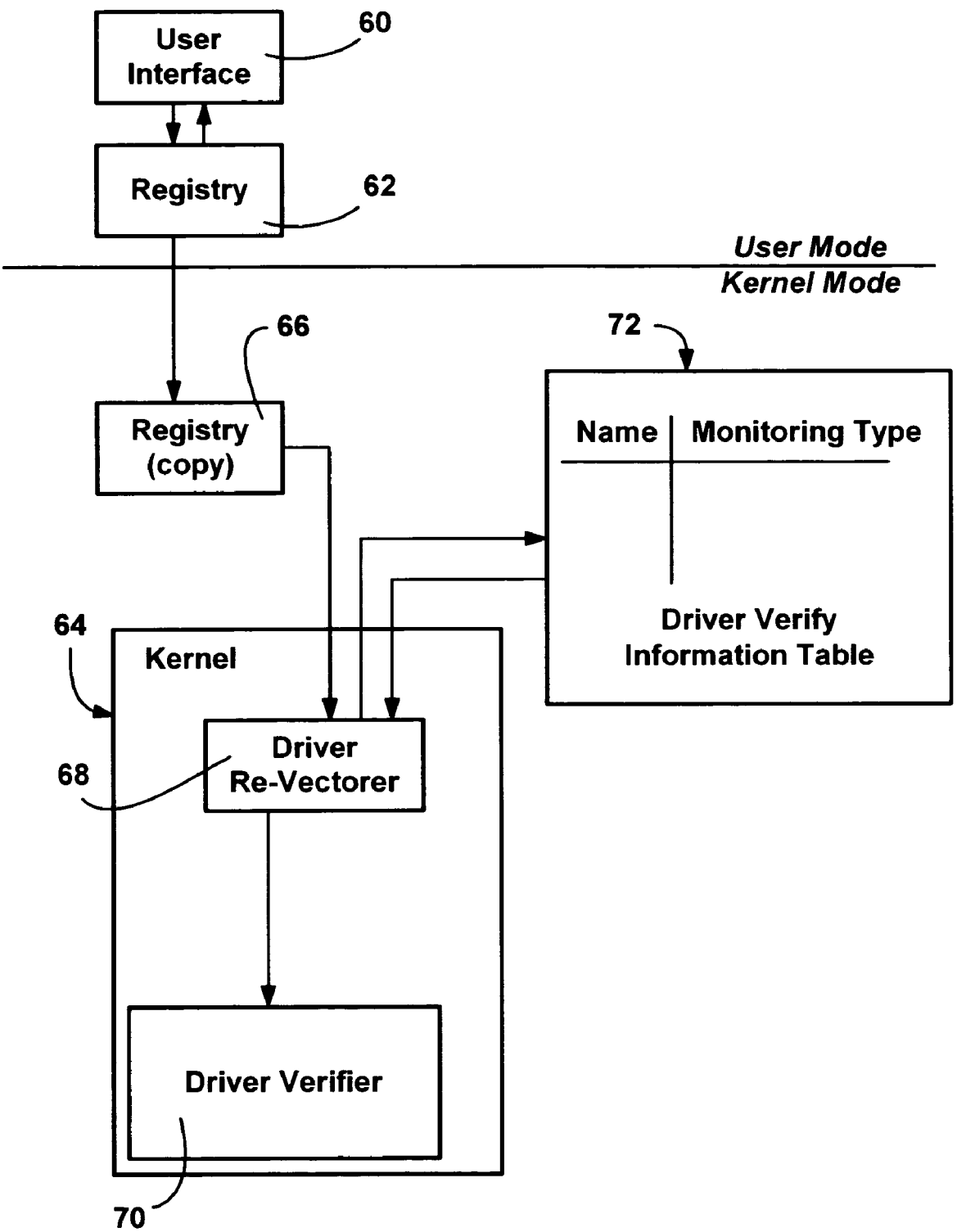
FIG. 2 is a block diagram generally representing a general architecture for monitoring drivers in accordance with an aspect of the present invention.

Turning to the drawings and referring first to FIG. 2, there is shown a general architecture into which the present invention may be incorporated. A user such as a program tester, system administrator or a developer debugging code accesses a user interface 60 to select one or more drivers to be tested along with one or more tests (described below) to be performed thereon. The user interface 60 then writes this driver/test information into the system registry 62. Note that the user may alternatively edit the registry 62 directly via the registry editor (e.g., regedt32), by setting the REG_SZ key "\\HKEY_LOCAL_MACHINE\SYSTEM\Current ControlSet \ Control\Session Manager\Memory Management\VerifyDrivers" to the name of the driver (e.g., Ntfs.sys) that is to be monitored/verified. Note that multiple drivers can be specified, however using only one driver at a time provides benefits, e.g., by ensuring that available system resources are not prematurely depleted, since premature depleting resources may cause the bypassing of some driver verification due to lack of resources.

The type of verification may be specified in the REG_DWORD key "\\HKEY_LOCAL_MACHINE\SYSTEM\Current ControlSet \ Control\Session Manager\Memory Management\VerifyDriverLevel." The bitfield values for this key (which can be freely combined) are shown as hexadecimal in TABLE 1, and represent the type of tests to perform, in accordance with the present invention and as described in detail below:

TABLE 1

| | |
|---|---|
| 0x01 | Attempt to satisfy all of this driver's allocations from a special memory pool. |
| 0x02 | Apply memory pressure to this driver to validate IRQL usage in regards to accessing pageable code and data. |

TABLE 1-continued

| | |
|---|---|
| 0x04 | Randomly fail various pool allocation requests. Note this is only done after the system has booted to a point wherein these failures can be treated as reasonable situations to be handled. |
| 0x08 | Enable pool allocation tracking. Every allocation must be freed before the driver unloads, or the system will bug check. |
| 0x10 | Enable the I/O verifier |

The default value is three (3) if the key does not exist or no level of driver verification is specified. Lastly, verification may be executed via a command line.

As shown in FIG. 2, the kernel 64 maintains a copy 66 of the registry, and when a driver is loaded, a driver re-vectorer subcomponent 68 accesses the registry copy 66 to determine whether the loaded driver has been specified as one to be monitored/verified. If so, the driver re-vectorer 68 will re-vector any calls from that driver to the kernel 64 to a driver verifier component 70, to specially test and monitor the driver in accordance with the present invention. For efficiency, the driver re-vectorer 68 may maintain a driver verify information table 72 or the like so that when drivers call the kernel 64, those drivers to be verified may be quickly identified and re-vectored to the driver verifier 70, along with any information the driver verifier 70 needs to perform the testing.

Figure 3A:
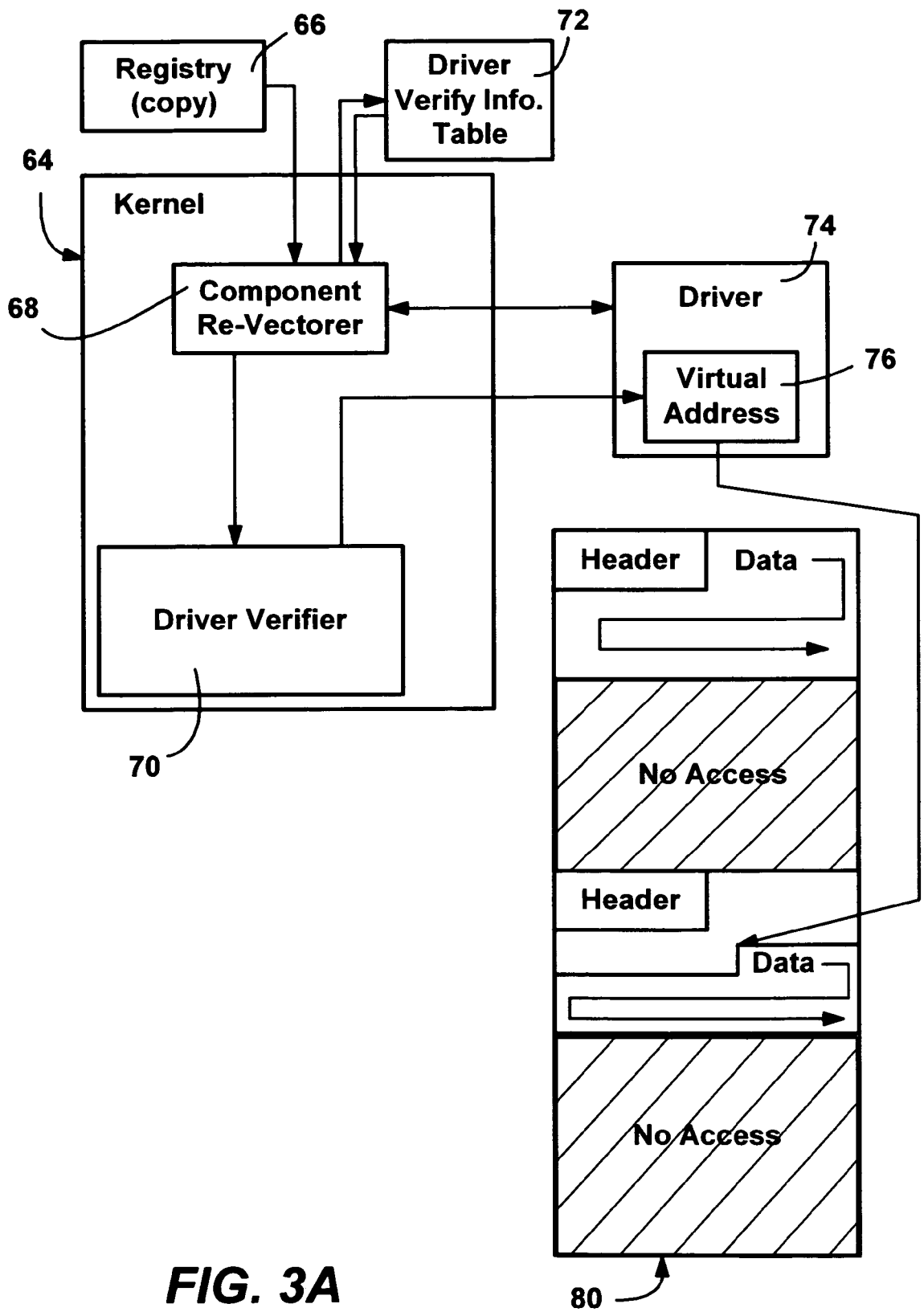
FIG. 3A is a block diagram generally representing the monitoring of a driver via a special memory pool allocation in accordance with an aspect of the present invention.

In accordance with one aspect of the present invention and as generally represented in FIG. 3A, one of the tests that may be performed by the driver verifier 70 is the detection of memory corruption via writing to a section not allocated to the driver, i.e., memory misuse by overruns and underruns. To detect memory corruption, the driver verifier 70 allocates driver memory from a special pool, and monitors that pool for incorrect access. More particularly, when a driver-to-be-tested 74 requests pooled memory from the kernel 64, the re-vectorer 68 re-vectors the call to the driver verifier 70. If the "special memory pool" bit is active, (and a global flag is set to overrun detection), each memory allocation requested by the driver 70 is placed on a separate page (that is not pageable to disk). To this end, as shown in FIG. 3A, the driver verifier 70 returns a virtual address 76 to the driver 74 that is the highest possible address which allows the allocation to fit on the page, in a virtual memory page pool 80, whereby the allocated memory is aligned with the end of the page. Note that an allocation may span multiple pages, however at present, only requests less than a page are put into subblocks (and can be special pooled/verified). Further note that a full page is allocated even when less than a full page is requested. The remainder of the page that precedes the data, if any, is written with random data, which may comprise a recorded pattern or the like to detect underruns.

To detect overruns, the previous page and the next page in the page pool 80 are marked inaccessible. Note that this is accomplished in Windows® 2000 via virtual memory management, wherein each virtual address is associated with a page table entry which comprises a physical address to which the virtual address maps, along with bits that control page access. Thus, the surrounding pages are marked "No Access" by the driver verifier 70 via the bit settings. Virtual memory management is further described in the references, "*Inside Windows NT®*," by Helen Custer, Microsoft Press (1993); and "*Inside Windows NT®, Second Edition*" by David A. Solomon, Microsoft Press (1998), hereby incorporated by reference herein.

Attempts to access memory beyond the allocation buffer (within a page) are immediately detected as an access violation, as such an access is within the subsequent, "No Access" memory page. Note that writing before the beginning of the buffer will (presumably) alter the random data, and when the buffer is freed, this alteration will be detected. In either case, a bug check (e.g., having a value of 0xC1 in one implementation) is issued, whereby the user can debug (or record for later debugging) the error. In keeping with the present invention, the immediate violation detection of overruns helps identify the errant driver.

Note that when underrun detection is selected for drivers, (via the global flag), the allocated memory is instead aligned with the beginning of the page. With this setting, underruns cause an immediate bug check, while overruns (may) cause a bug check when the memory is freed. In actual implementations, underrun errors tend to occur less often then overrun errors.

Further, note that each allocation from the special pool 80 uses one page of non-pageable memory and two pages of virtual address space, burdening system resources. If the special pool 80 is exhausted, memory is allocated in the standard way until the special pool 80 becomes available again, and thus depending on a system's resources, verifying multiple drivers in this manner at the same time may cause errors to be missed. A debugger extension can be used to monitor special pool use, and report whether the special pool covered all memory allocations or whether the special pool was exhausted. Note that the size of the pool may be automatically or manually configured based on the amount of physical memory on the system.

Figure 3B:
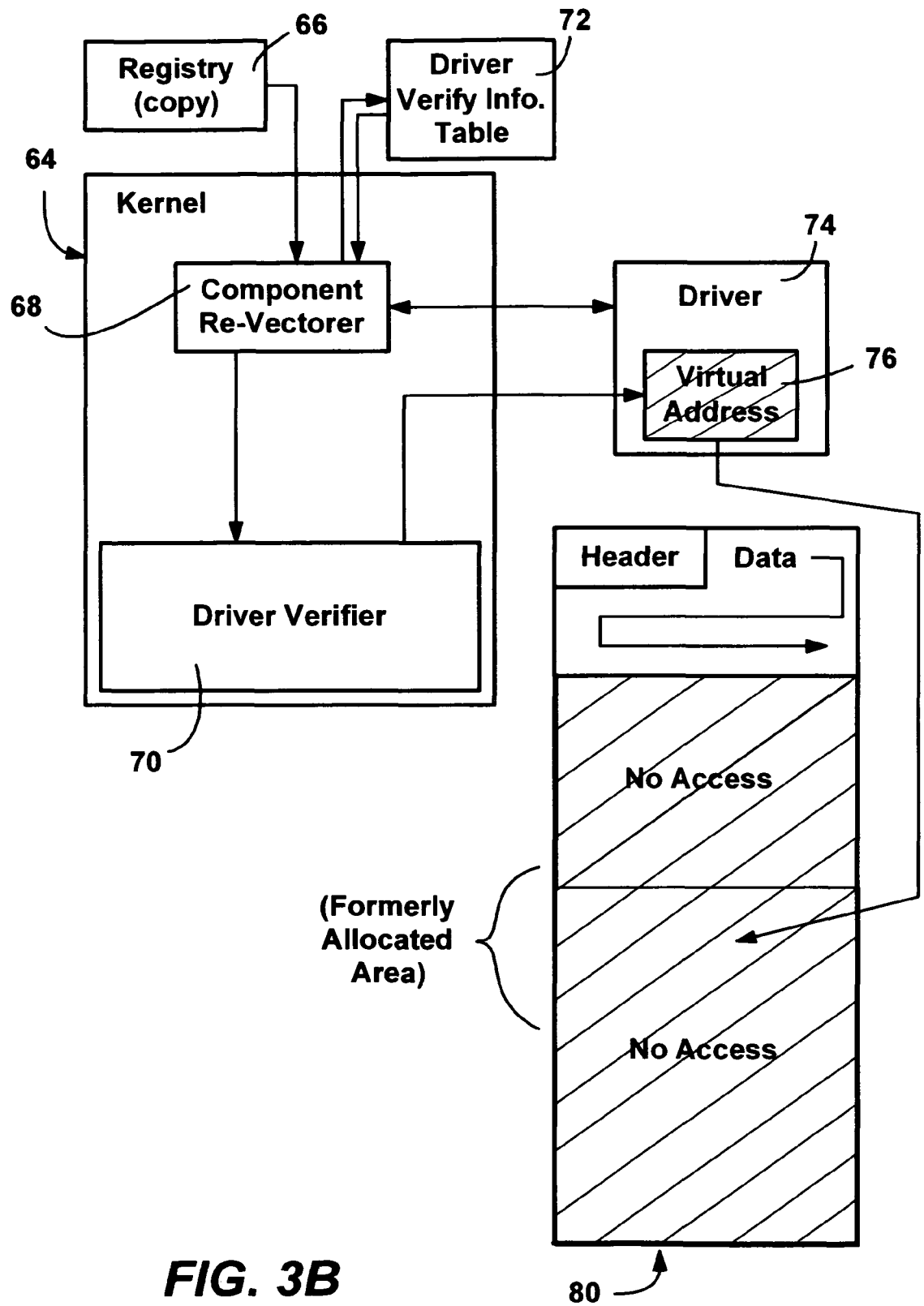
FIG. 3B is a block diagram generally representing the monitoring of a driver after deallocation of the memory pool allocation of FIG. 3A in accordance with an aspect of the present invention.

Another test of memory misuse that the driver verifier 70 performs is represented in FIG. 3B, whereby when the driver 74 deallocates memory from the special pool 80, instead of freeing the virtual address space, the entire section is marked "No access." As a result, any subsequent read or write back to the formerly allocated area is also detected via an access violation.

Figure 4:
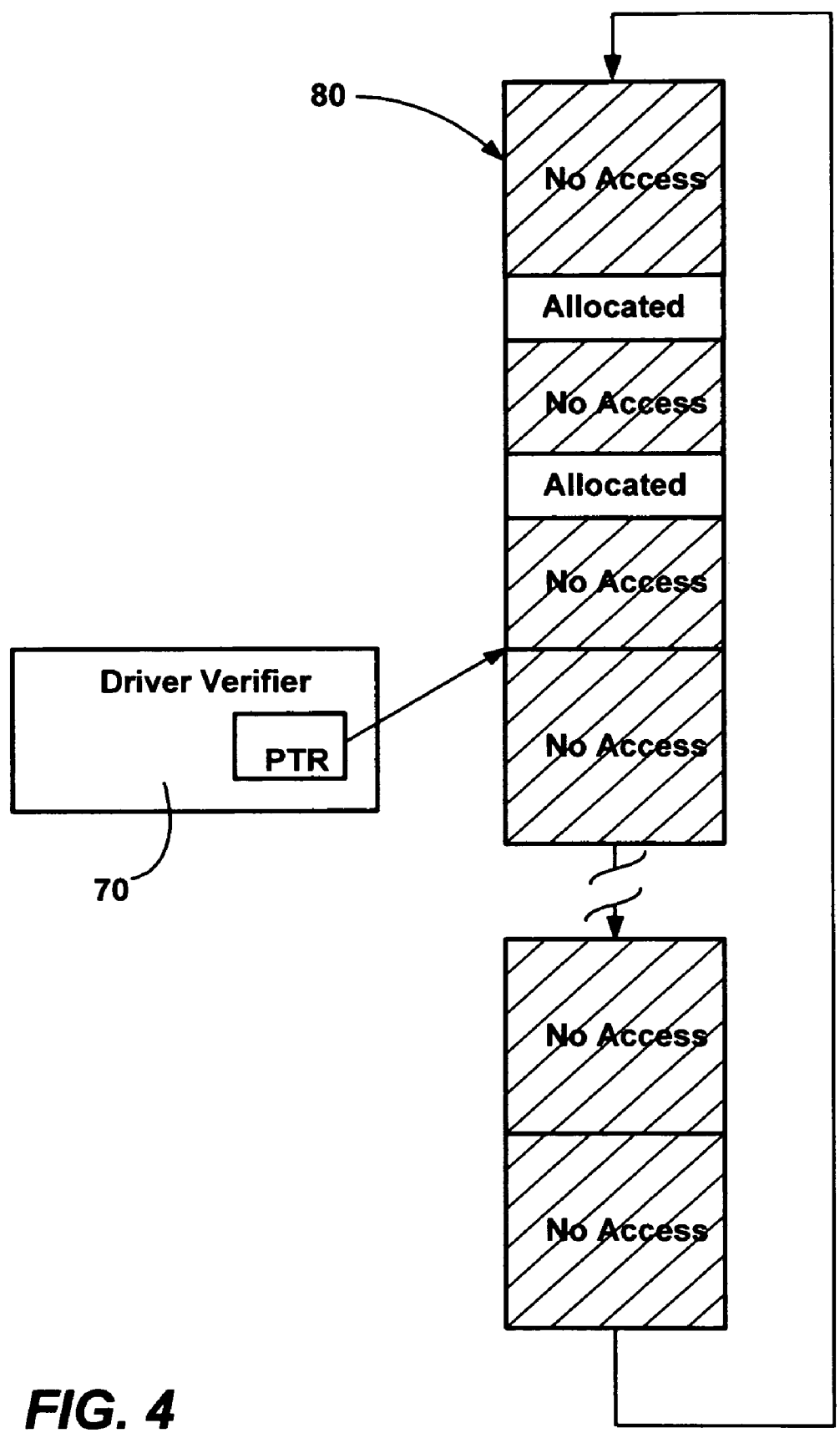
FIG. 4 is a block diagram generally representing a special memory pool and illustrating the reuse of virtual memory therein in accordance with an aspect of the present invention.

However, because memory space is finite, the system needs to reuse the special pool 80 at some time. To this end, as shown in FIG. 4, the special pool is essentially arranged as a queue with respect to the deallocated pages. More particularly, once deallocated, a page is reused only after cycling through a large number (e.g., 50,000 or more) of allocations to other areas of the pool 80. To this end, the driver verifier 70 may maintain a pointer or the like to the appropriate virtual address in the pool 80, e.g., the address of the virtual next location in which space for allocating and bounding the allocated page is available. Note that a page that is still allocated and its surrounding "No Access" pages are skipped over such that only deallocated pages are reused.

In accordance with another aspect of the present invention, other types of incorrect usage of pooled memory may also be detected for a specified driver. A first way in which an error may occur is by having a pending timer remain in deallocated pool. To detect this, the driver verifier 70 examines the memory pool deallocated by a driver being verified, and if timers are found, the driver verifier issues a bug check (e.g., 0xC7).

Figure 5:
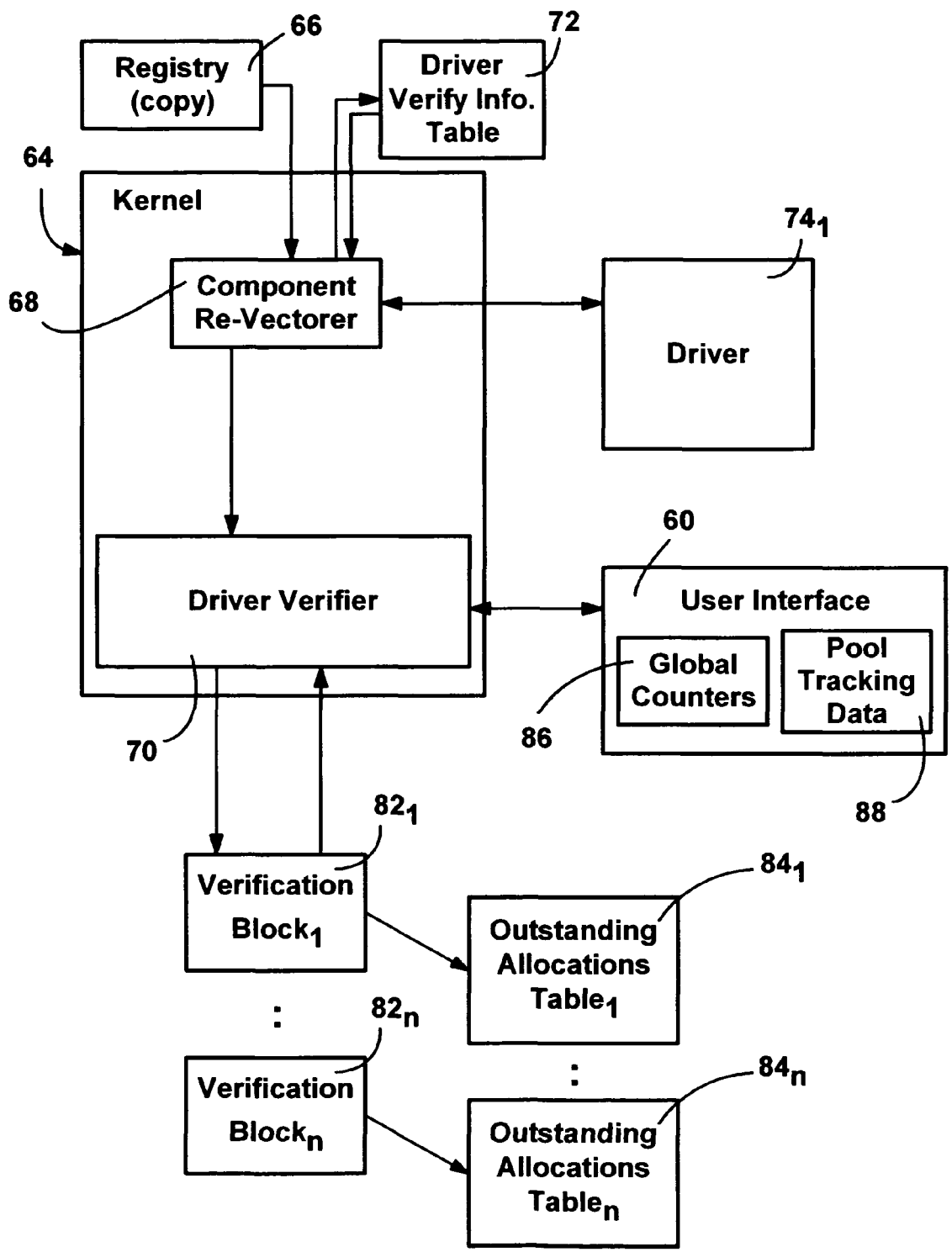
FIG. 5 is a block diagram generally representing driver verification by tracking drivers' pool allocations in accordance with an aspect of the present invention.
Figure 6:
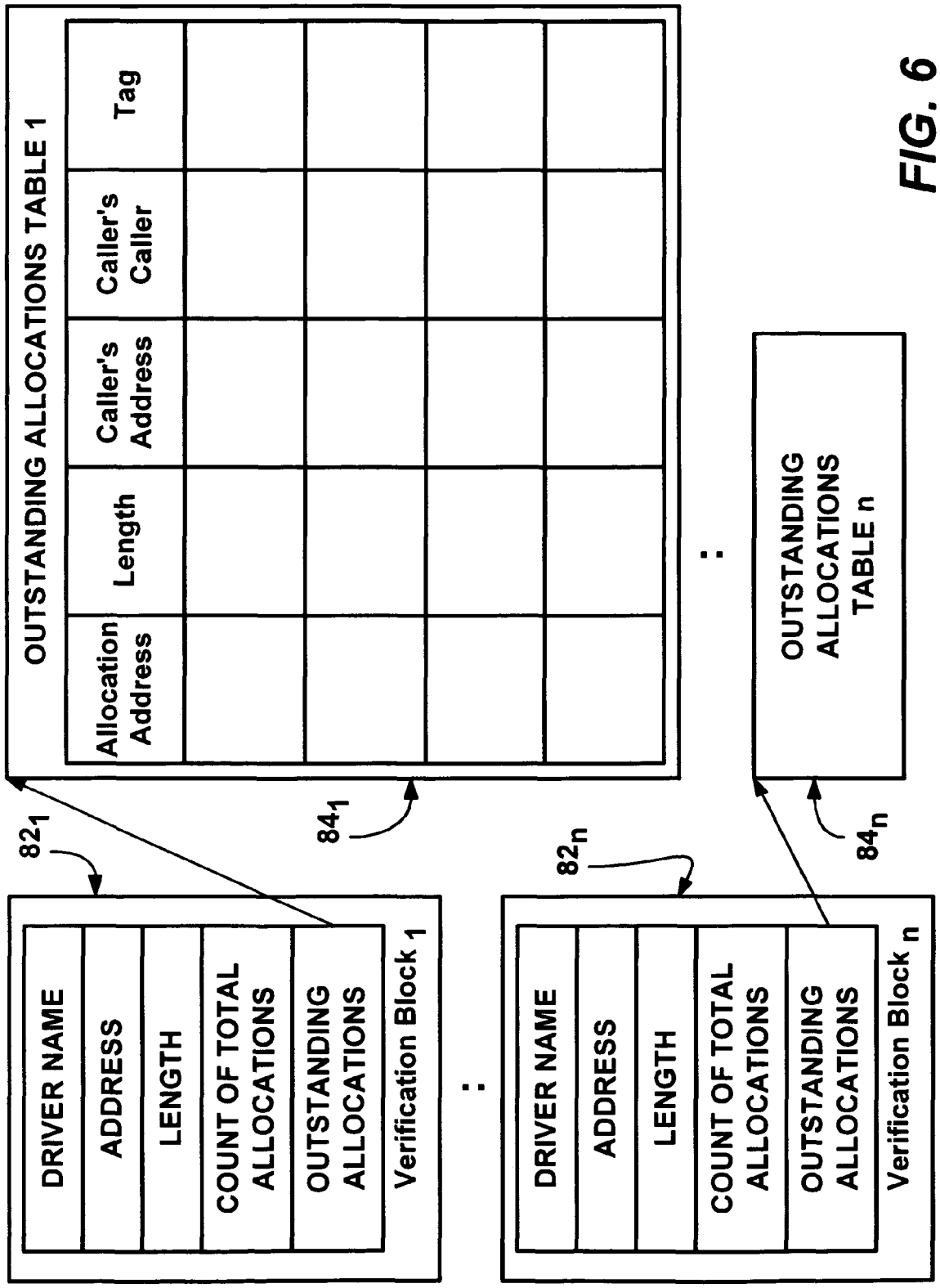
FIG. 6 is a block diagram generally representing data structures used for tracking drivers' pool allocations in accordance with an aspect of the present invention.

Memory leaks are also a misuse of pooled memory, and the driver verifier 70 may be selectively enabled to test for such errors. To this end, as represented in FIGS. 5 and 6, when this option is enabled for a driver $74_1$, the driver verifier 70 initially sets up two data structures, a verification block $82_1$ and an outstanding allocation table $84_1$, to track the pool allocations for that driver $74_1$. Note that multiple verification blocks $82_1$-$82_n$ and outstanding allocation tables $84_1$-$84_n$ may be set up, one for each driver having pool allocation tracking enabled. Further note that pool tracking is independent of the above-described memory usage testing, and thus may track regular pool allocations or special pool allocations.

Figure 7:
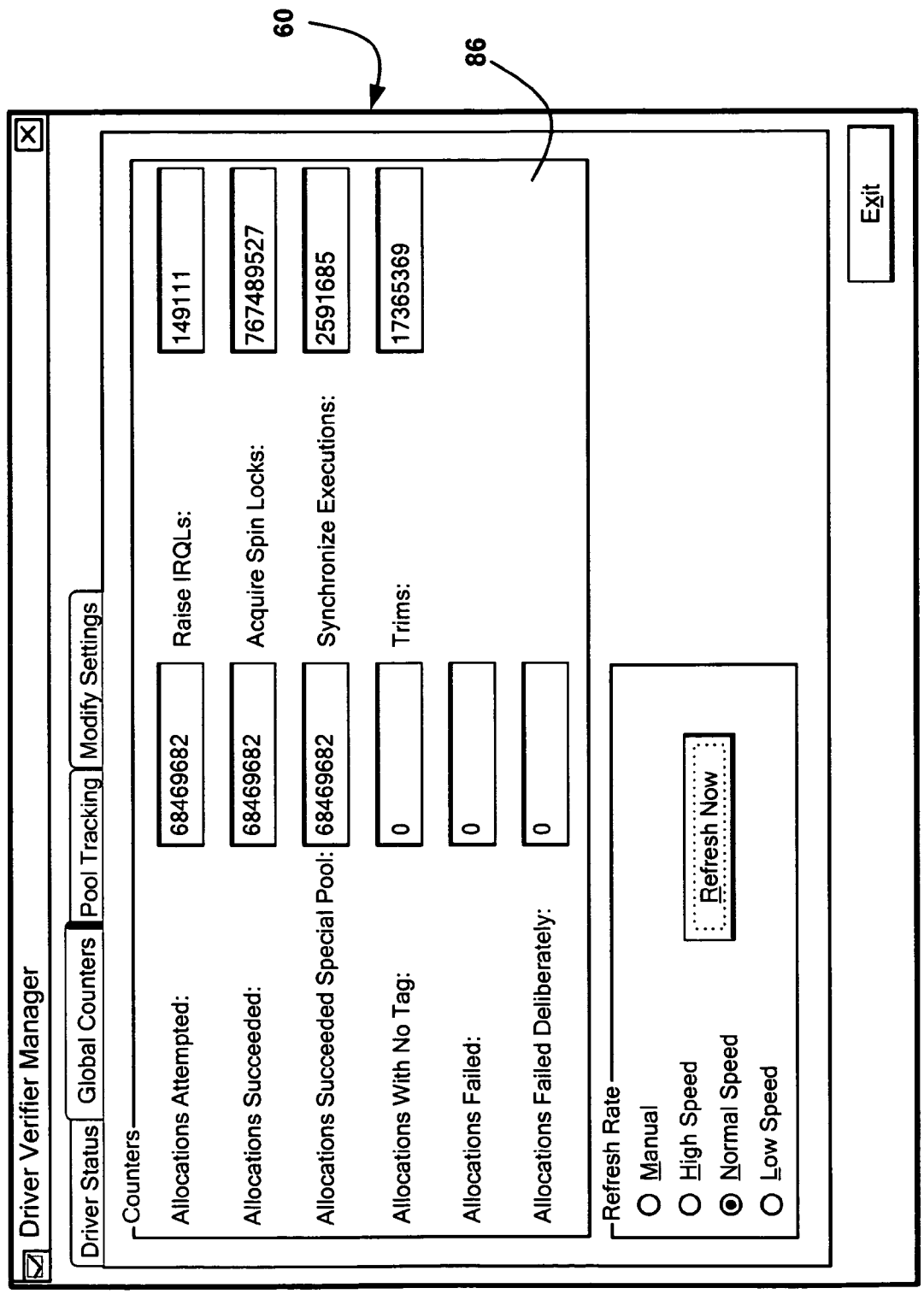
FIG. 7 is a representation of a user interface screen showing global counters tracking drivers' pool allocations in accordance with an aspect of the present invention.

As generally represented in FIG. 6, the verification block (e.g., $82_1$) comprises driver information including a count of the total allocations for this driver. Other information may be maintained in the verification block, such as various allocation information for this driver, shown in the user interface 60 displaying a global (i.e., for all tracked drivers) counters display page 86 (FIG. 7).

The verification block $82_1$ also includes a pointer to the outstanding allocations table $84_1$ set up for this driver $74_1$. The outstanding allocations table $84_1$ tracks specific information about each pool allocation that the driver has been given that remains outstanding, i.e., has not yet deallocated. The information includes the allocation's virtual address, length, and information useful in debugging such as per-process caller information and the tag of the driver that allocated the memory, e.g., "TCP" for TCP/IP drivers.

To track pool allocations, each new allocation by the driver $74_1$ adds information to its allocation table $84_1$, while each deallocation removes the information. Note that the information need not actually be erased from the table $84_1$, as it is equivalent to effectively "remove" the information by marking it as deallocated. If the driver $74_1$ unloads, the driver verifier 70 examines the outstanding allocations table $84_1$ and issues a bug check if any memory allocated by the driver has not been deallocated. In this manner, memory leaks are detected and can be more easily debugged. The driver verifier 70 also attempts to page in all paged-out allocations by the driver $74_1$ when the driver $74_1$ is unloaded, making it easier to debug the driver $74_1$.

Note that another driver may deallocate pooled memory for the driver $74_1$. As understood from the above description, this deallocation by the other driver needs to be removed from the outstanding allocations table $84_1$, otherwise the system will incorrectly generate a bug check when the driver $74_1$ unloads. In order for the outstanding allocations table to properly reflect such a deallocation, at the time of allocation, any memory allocated to a driver with pool tracking on is tagged (via bits in the header). Anytime the kernel 64 deallocates memory with this tag, the driver verifier 70 is notified, whereby the allocation information is located and properly removed the from the appropriate outstanding allocations table.

Figure 8:
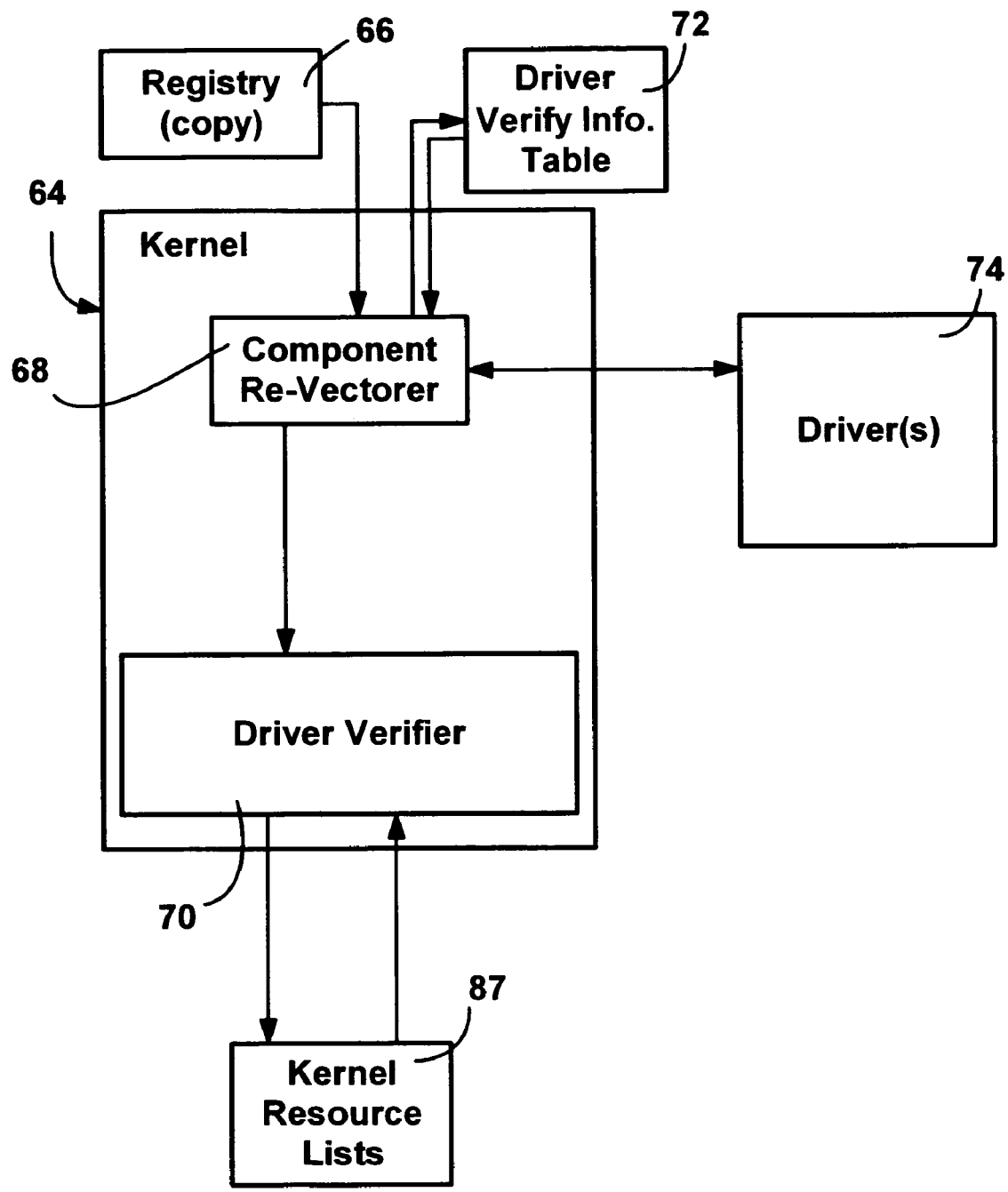
FIG. 8 is a block diagram generally representing verification of resource cleanup at driver unload in accordance with an aspect of the present invention.

In addition to detecting memory leaks on unload, the driver verifier 70 performs several other checks on unload. More particularly, the driver verifier looks for undeleted timers, pending DPCs, undeleted lookaside lists, undeleted worker threads, undeleted queues and other similar resources that remain. To this end, the driver verifier 70 examines resource lists 87 (FIG. 8) maintained by the kernel 64 to check whether a driver still has such items listed therefor. In this manner, checks are made to ensure that a driver being verified fully cleans up these resources on unload, since failing to do so is known to cause crashes that may be extremely difficult to debug.

While a driver is loaded, other information may be evaluated by a user that may provide insight beyond that detected at unload time. For example, the user interface 60 is capable of displaying pool tracking data 88 for a given driver while the driver is loaded. In one implementation, the pool tracking data is displayable via a property page that shows the statistics gathered from the driver verifier. The counters shown on the page are related to the pool tracking flag of the verifier and are mostly per-driver counters, (e.g., current allocations, current allocated bytes, and so forth), with the specific driver being selectable via the user interface 60. In this manner, a tester may examine a loaded driver's usage of pooled memory, e.g., see to whether relatively many allocations are outstanding when only relatively few are expected.

Other property pages are displayable, such as a "Driver Status" property page that provides an image of the current status of the driver verifier 70. For example, a user can see a list of drivers of which the verifier 70 is aware. The status can be "Loaded" (the driver is loaded and verified right now), "Unloaded" (the driver is not loaded now but it has been loaded at least once since reboot), or "Never Loaded" (the driver was never loaded, which may suggest that the driver's image file is corrupted or that the user specified a driver name that is missing from the system). A user may also view the current types of verification that are in effect.

The Global Counters property page 86 (FIG. 7) shows the current value of some of the counters maintained by the driver verifier 70. A zero value of a counter can be an indication that the associated driver verifier flag is not enabled, e.g., if the Other/Faults injected (described below) counter is zero, this is an indication that the low resource simulation flag is not enabled. In this manner, a user may monitor the activity of the verifier 70 with the values of the counters updating automatically.

A settings page may be used to create and modify the driver verifier 70 settings, which are saved in the registry 62 as described above. The user can use the list to view the currently installed drivers in the system. At present, each driver can be in four possible states, including "Verify Enabled"—the driver is currently verified—or "Verify Disabled"—the driver is currently not verified—. The other possible states are "Verify Enabled" (Reboot Needed)—the driver will be verified only after the next reboot—and "Verify Disabled" (Reboot Needed)—the driver is currently verified but will not be verified after the next reboot—. The user can select one or more drivers from the list and switch the status. The user can also specify additional drivers to be verified after next reboot, such as when the user wants to install a new driver that is not loaded already loaded. Lastly, a Modify Settings property page is provided for dynamically changing volatile driver verifier flags.

Figure 9:
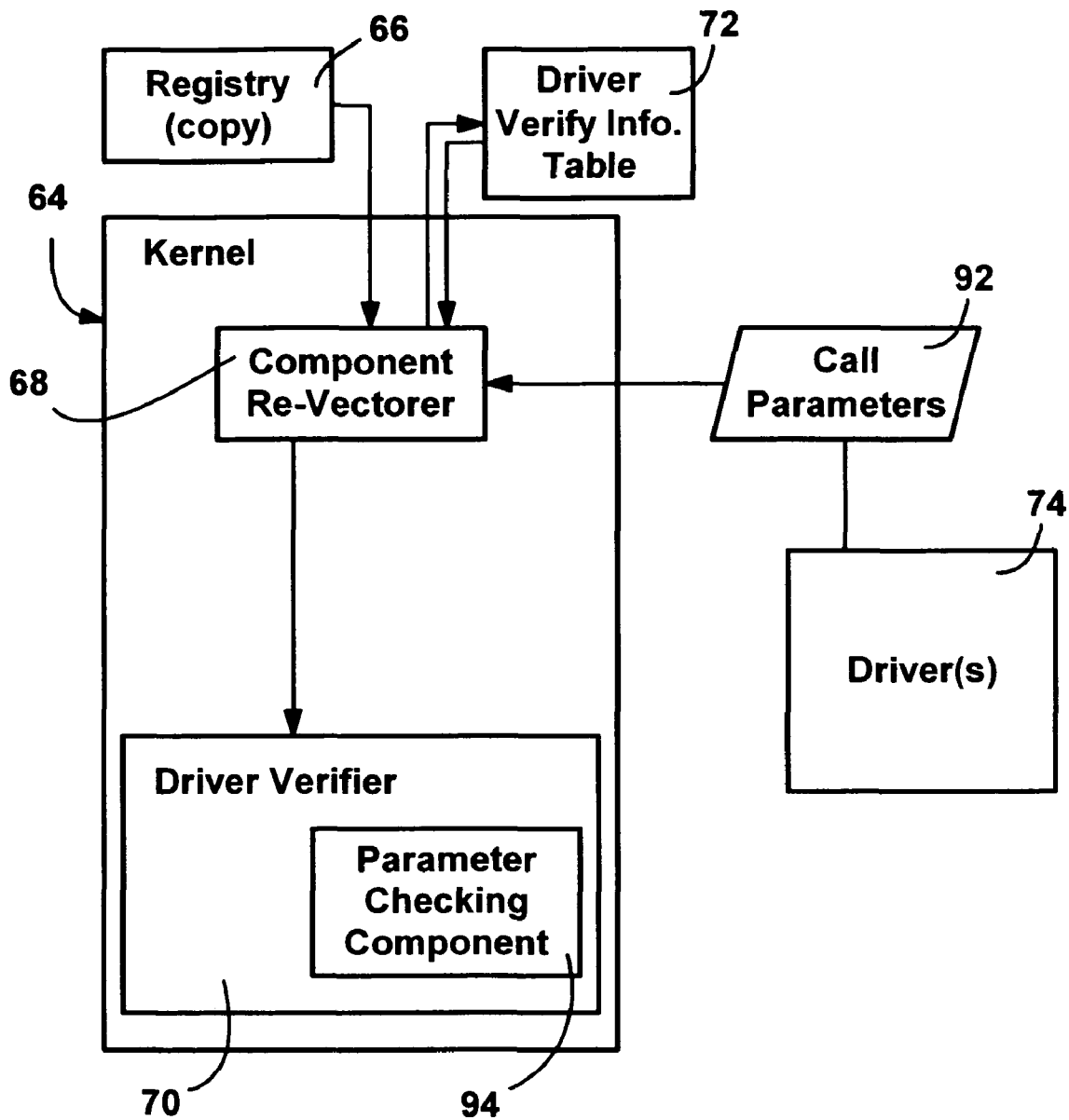
FIG. 9 is a block diagram generally representing verification of parameters on driver calls to the kernel in accordance with an aspect of the present invention.

In accordance with another aspect of the present invention, the driver verifier 70 examines the function calls of each selected driver to monitor for certain actions that are forbidden. In one implementation, the driver verifier 70 performs this automatically for each driver being verified, although this checking alternatively may be made selectable. More particularly, as represented in FIG. 9, function calls to the kernel have call parameters 92 and a requested operation associated therewith. The driver verifier 70 includes a parameter checking component 94 that essentially maintains a set of rules and other information to validate the request and its parameters. For example, some straightforward violations include requesting a size zero memory allocation, trying to deallocate (free) an address that was not returned from an allocate request call or trying to free an address that was already freed. Also, a check is made to ensure that no illegal or random (uninitialized) parameter values are specified to certain kernel APIs. The driver verifier 70 issues a bug check if these or other such violations (described below) occur.

Another type of violation occurs when a driver attempts to raise or lower its interrupt request level (IRQL), i.e., by calling KeRaiseIrql or KeLowerIrql. For these types of calls, the driver verifier checks that a raise IRQL really is a raise (i.e., the current IRQL is less than the target IRQL) or that a lower IRQL really is a lower IRQL.

Other IRQL-related errors occur when paged and non-paged pool allocations and deallocations are made at the incorrect IRQL. Paged pool allocations and deallocations need to be made at the asynchronous procedure call level (APC_LEVEL) IRQL or below, while non-paged pool allocations and deallocations need to be made at the DISPATCH_LEVEL IRQL or below. Allocating or freeing paged pool at an IRQL above APC_LEVEL, or allocating or freeing non-paged pool at an IRQL above DISPATCH_LEVEL is detected as a violation.

Still other detected violations include acquiring or releasing a fast mutex at an IRQL above APC_LEVEL, acquiring or releasing a spin lock at an IRQL other than DISPATCH_LEVEL, and double release of a spinlock. Mutexes and spinlocks are described in the aforementioned references "Inside Windows NT®" and "Inside Windows NT®, Second Edition." These violations similarly cause a bug check to be generated. Note that other types of violations may be added to those being monitored by the verifier 70.

In accordance with another aspect of the present invention, the driver verifier can simulate extreme conditions, and thereby proactively force errors in a driver (e.g., 74) that may be otherwise difficult to reproduce. A first way in which is accomplished is to randomly fail pool allocation requests (and other APIs). To this end, (after seven minutes or some other duration following system startup so as to accurately simulate a low-memory condition), any allocation request calls placed in a certain time window are failed, while others outside the window are not failed. For example, the driver verifier 70 may be configured to fail any call made within in a one-second interval (that restarts every fifteen seconds), providing a generally psuedo-random nature to the failures. Other intervals and periods may be used. The injection of such allocation faults tests the driver's ability to react properly to low-memory conditions. Note that allocation requests marked MUST_SUCCEED (a maximum of one page of MUST_SUCCEED pool is permitted) are not subject to this action.

Another way in which errors may be forced is to place extreme memory pressure on the driver by invalidating its pageable code. Although kernel-mode drivers are forbidden to access pageable memory at a high IRQL or while holding a spin lock, such an action might not be noticed if the page has not actually been trimmed (i.e., paged-out). To detect this, whenever the driver's IRQL is raised to DISPATCH_LEVEL or higher, or when a spin lock is requested, the driver verify marks the driver's pageable code and data (as well as system pageable pool, code, and data) as trimmed. Thus, any attempt by the driver to access this memory indicates an attempt to access paged memory at the wrong IRQL, or while holding a spin lock, whereby the driver verifier issues a bug check.

Note that drivers that are not selected for verification will not be directly affected by this memory pressure since their IRQL raises will not cause this action. However, when a driver that is being verified raises the IRQL, the driver verifier 70 trims pages which may be used by drivers that are not being verified. As a result, errors by drivers that are not being verified may occasionally be detected by this action.

Another aspect of the driver verifier 70 is that it is extensible and provides APIs so that other drivers can provide "mini-verifiers" for their subcomponents. For example, not all kernel drivers (e.g., display drivers, kernel-mode printer drivers, network mini-port drivers) are allowed to call the kernel directly for allocating pool. Because of this difference, the driver verifier treats graphics drivers somewhat differently than it treats other kernel-mode drivers.

Figure 10:
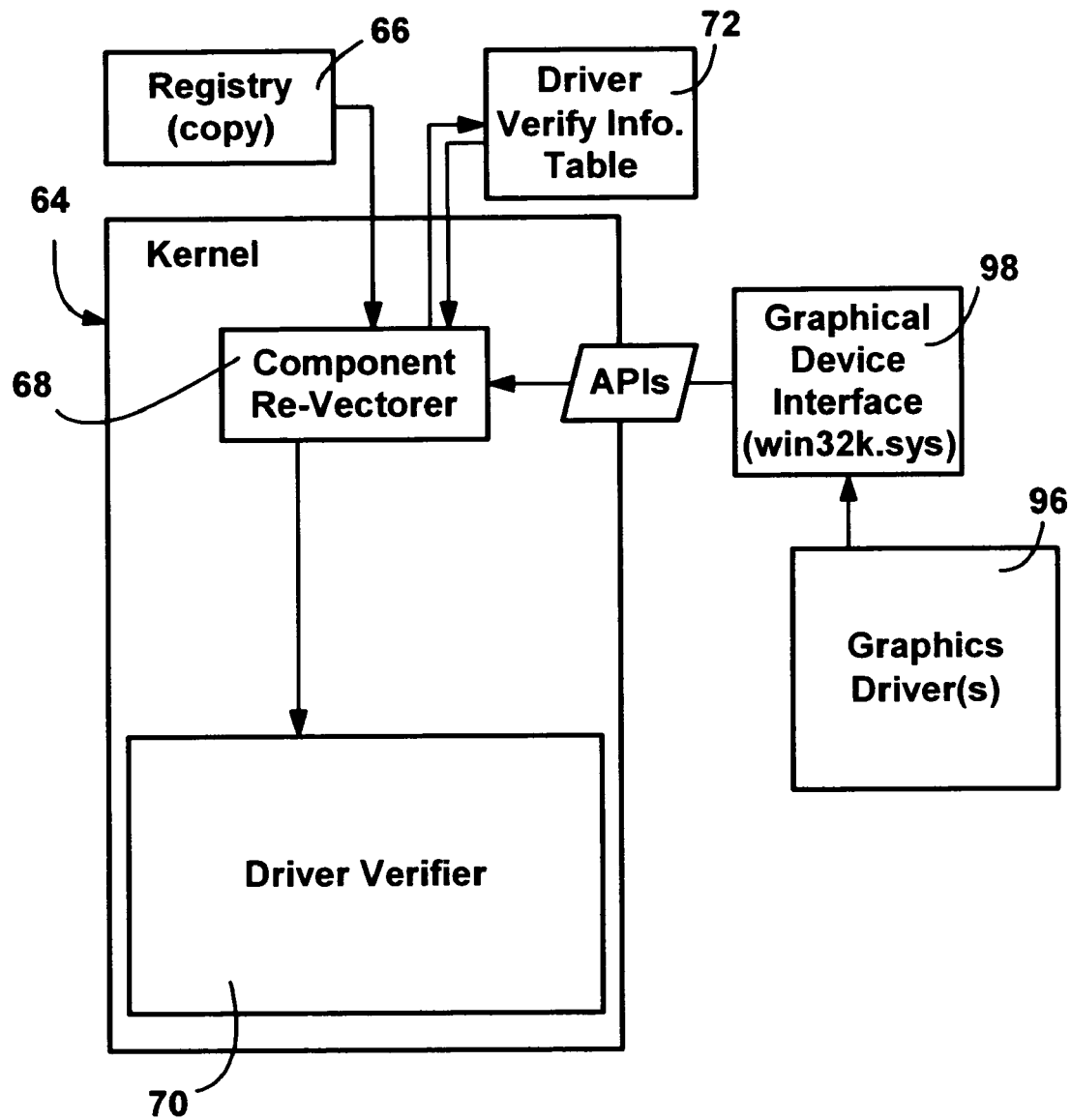
FIG. 10 is a block diagram generally representing verification of subcomponents of other drivers in accordance with an aspect of the present invention.

By way of example, as generally shown in FIG. 10, kernel-mode graphics drivers 96 and print drivers do not allocate pool directly, but instead allocate pool via callbacks to GDI (Graphical Device Interface) service routines 98 (e.g., exported by win32k.sys in Windows® 2000). For example, EngAllocMem is the callback that a graphics driver 96 calls to explicitly allocate pool memory, and other specialized callbacks such as EngCreatePalette and EngCreateBitmap return pool memory as well.

To provide the above-described automated testing for the graphics drivers (e.g., 96), support for some of the driver verifier functions have been incorporated into the GDI 98, i.e., via API calls to the driver verifier 70, the GDI 98 may use the driver verifier facility to further verify video and print drivers. Note that the "ndis.sys" driver may do the same for network miniport drivers. Further, note that the driver verifier 70 may be set to verify the GDI driver 98 itself, although this has the effect of verifying all graphics drivers simultaneously, and thus to obtain more specific information about a graphics driver, the driver itself may be verified directly.

However, because graphics drivers are more restricted than other kernel-mode drivers, they require only a subset of the driver verifier functionality. For example, IRQL checking and I/O verification are not needed, and thus the above-described automatic checks which the driver verifier 70 usually performs (e.g., verification of IRQL and memory routines, checking freed memory pool for timers, and checking on driver unload) are not made when verifying a graphics driver. Similarly, the force IRQL checking option and I/O verifier option (described below) are not used for graphics drivers, and if selected, have no effect.

The other functionality provided by the driver verifier 70, namely using special pool, random failure of pool allocations, and pool tracking, are supported in the different graphics GDI callbacks. Table 2 lists the following GDI callback functions that are subject to the random failure test:

TABLE 2

EngAllocMem
EngAllocUserMem
EngCreateBitmap
EngCreateDeviceSurface
EngCreateDeviceBitmap
EngCreatePalette
EngCreateClip
EngCreatePath
EngCreateWnd
EngCreateDriverObject
BRUSHOBJ__pvAllocRbrush
CLIPOBJ__ppoGetPath By way of summary, the general operation of the present invention is described below with respect to the flow diagrams of FIGS. 11-15. It should be understood, however, that the flow diagrams should not be considered as representing the actual code, but instead are simplified and provided to summarize the various functions and tests performed by the driver verifier 70.

Figure 11:
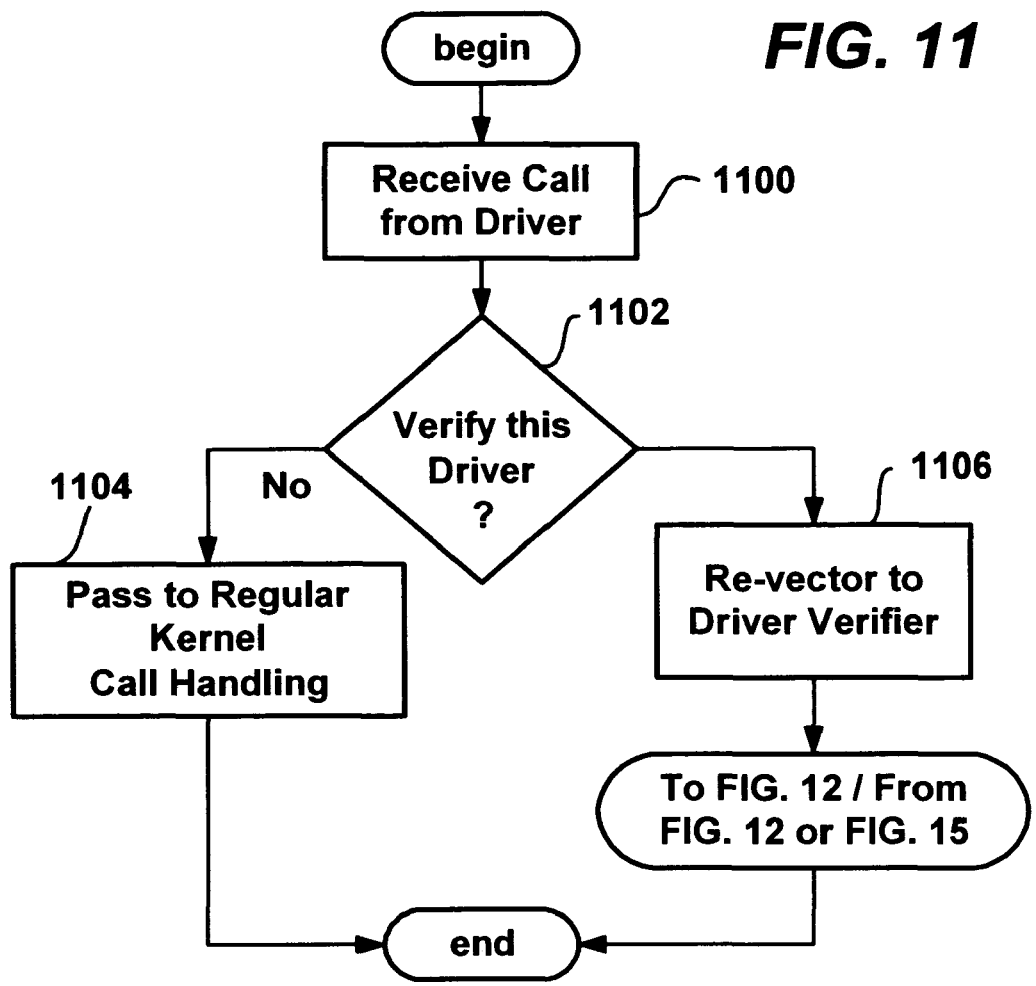
FIG. 11 is a flow diagram generally representing a determination of whether to re-vector a driver's call in accordance with an aspect of the present invention.

Step 1100 of FIG. 11 represents a call coming in from a driver (e.g. 74) to the kernel 64. At step 1102, the re-vectoring component 68 determines whether the driver is one that is being verified. If not, step 1104 represents the providing of the call to the kernel 64, to handle as a regular request. If however the re-vectoring component 68 determines that the call is to be re-vectored, it passes the call to the driver verifier 70 at step 1106.

Figure 12:
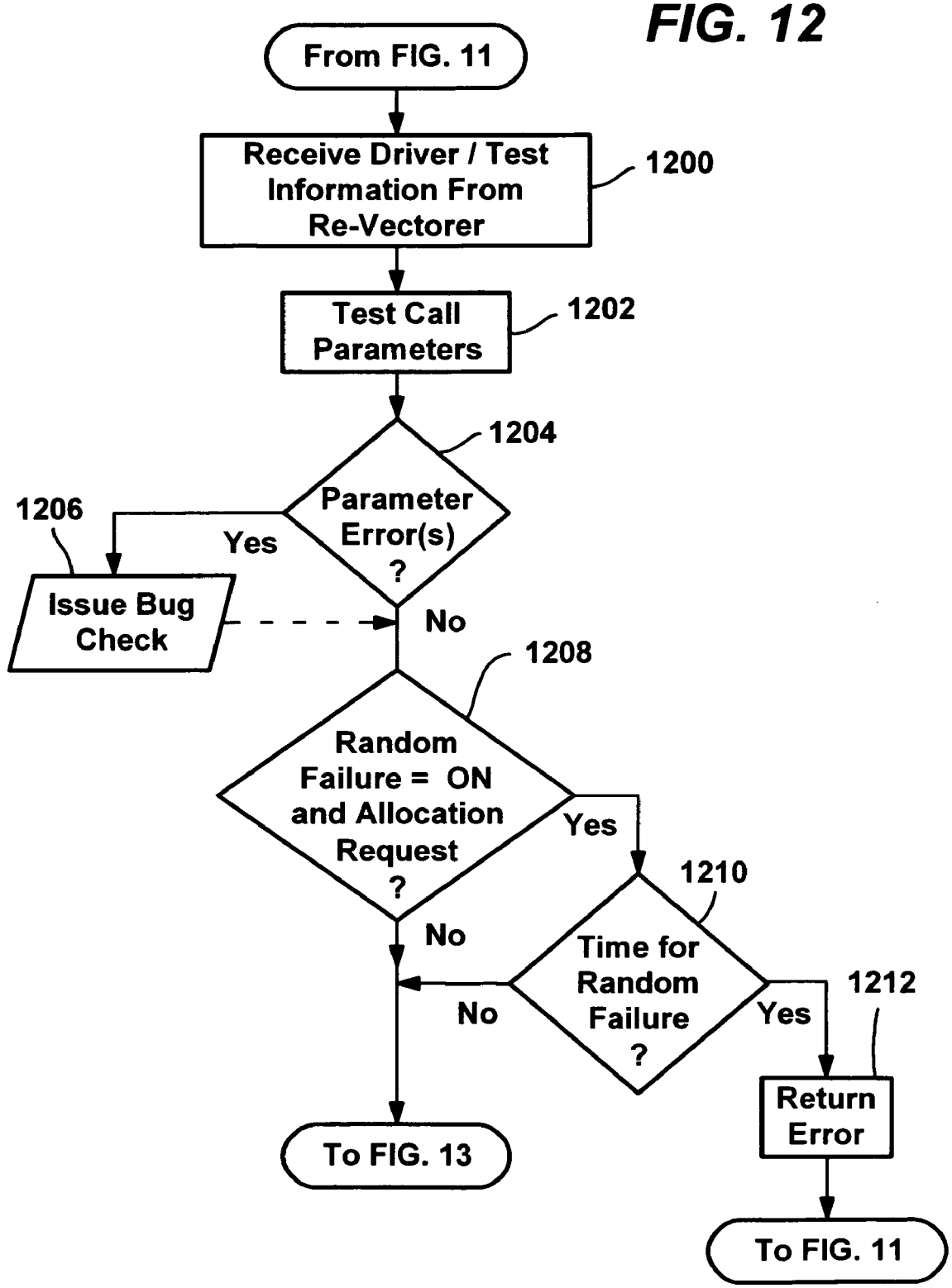
Figure 13:
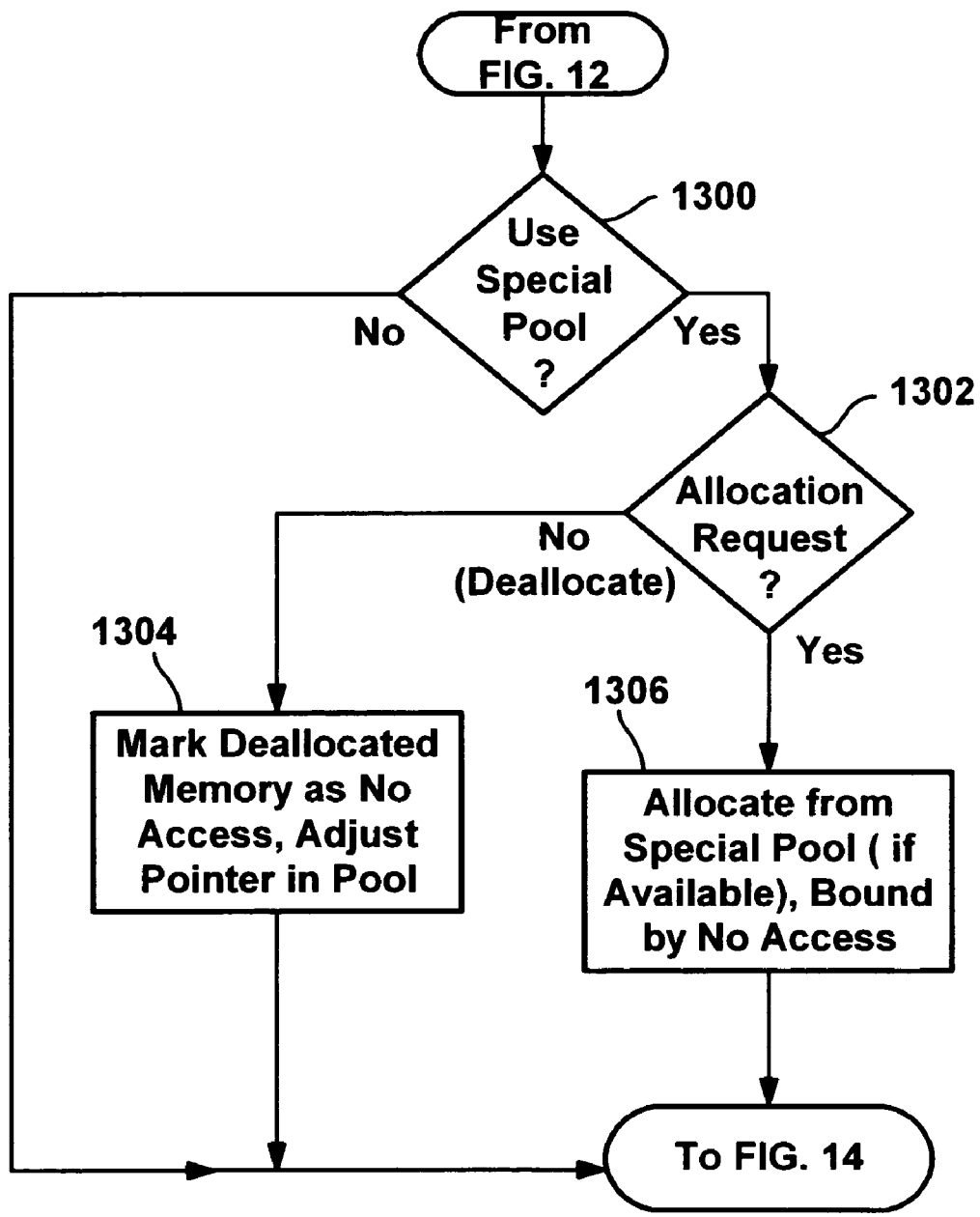
Figure 14:
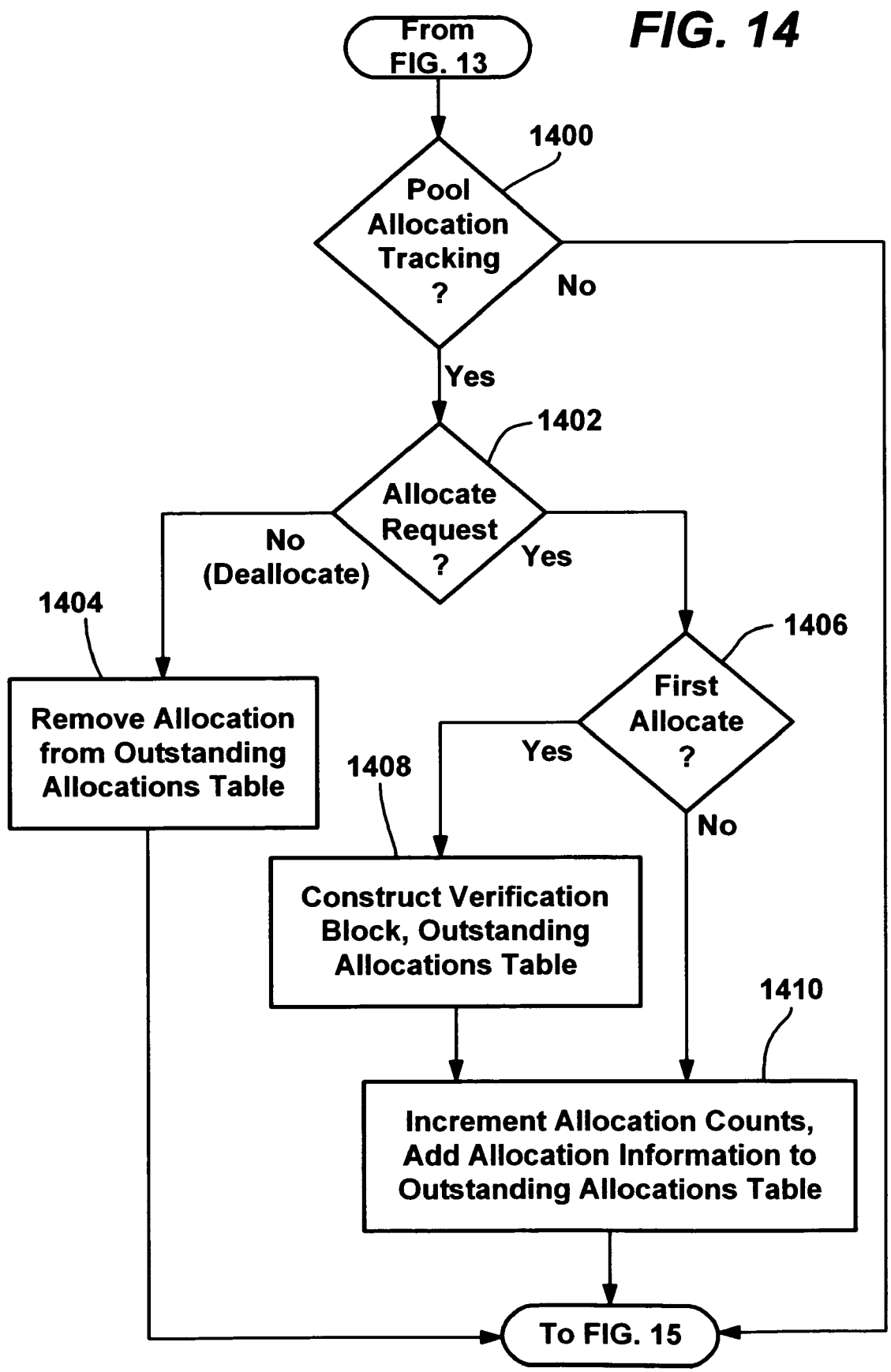

FIGS. 12-14 represent the various tests performed by the verifier once the verifier 70 receives the call and the testing information from the re-vectoring component 68 (step 1200). At step 1202, the driver verifier 70 tests the call parameters against the various above-described rules to ensure that no violations have occurred. If a violation is found, a bug check is issued as represented via steps 1204-1206. This ordinarily should a crash the system, however it is feasible that in some situations it might be desirable to continue testing (as represented by the dashed line from step 1206 to step 1208.

If no errors are found (or testing is to continue despite an error), step 1208 is executed and represents the checking of the bitfield value for the driver level key to determine if random failures are enabled, along with a check as to whether the request corresponds to a request for pooled memory. If not, the process branches to the next test (as represented by FIG. 13). If so, step 1208 branches to step 1210 to determine if it is time for a random failure, e.g., after seven minutes and in the correct time interval, as described above. If it is time to inject a failure, step 1210 branches to step 1212 where an out-of-pooled memory error or the like is returned, after which the testing process ends. Otherwise, step 1210 continues to the next test (FIG. 13).

Step 1300 of FIG. 13 represents the testing by the driver verifier 70 of whether the bitfield value for the driver level key specifies that the special pool 80 should be used for this driver. If not, step 1300 advances to the next test (represented in FIG. 14). If the special pool 80 is to be used, step 1300 branches to step 1302 to determine whether the call corresponds to an allocation request or a deallocation request. If a deallocation request, step 1302 branches to step 1304 where as described above, the deallocated memory page is marked as "No Access" to detect post-deallocation read-write access errors. If instead an allocation request is being made, step 1302 branches to step 1306 where the memory (if available) is allocated from the special pool 80 by locating a page and returning a pointer to appropriate virtual location therein as described above. If space in the special pool was available, the page before and after the allocated page is marked as "No Access" to bound the allocated memory location, as also described above.

Step 1400 of FIG. 14 represents the evaluation of the bitfield value to determine if pool allocation tracking is on for this driver. If not, step 1400 branches to FIG. 15 for the next test, otherwise step 1400 branches to step 1402 to determine whether the call is an allocation request or a deallocation request. If a deallocation request, step 1402 branches to step 1404 to remove the allocation information form the outstanding allocations table for this driver. If an allocation request, step 1402 branches to step 1406, which represents the setting up of a verification block and corresponding outstanding allocations table for this driver if this is the first allocation requested by this driver. Note that alternatively, the verification block and corresponding outstanding allocations table may be set up for each driver to be tested for pool allocation tracking when the registry copy 66 is first read. In any event, step 1410 represents the updating of the various allocation counts (e.g., the total allocations count in the verification block) and the adding of the allocation information to the outstanding information table for this driver.

Figure 15:
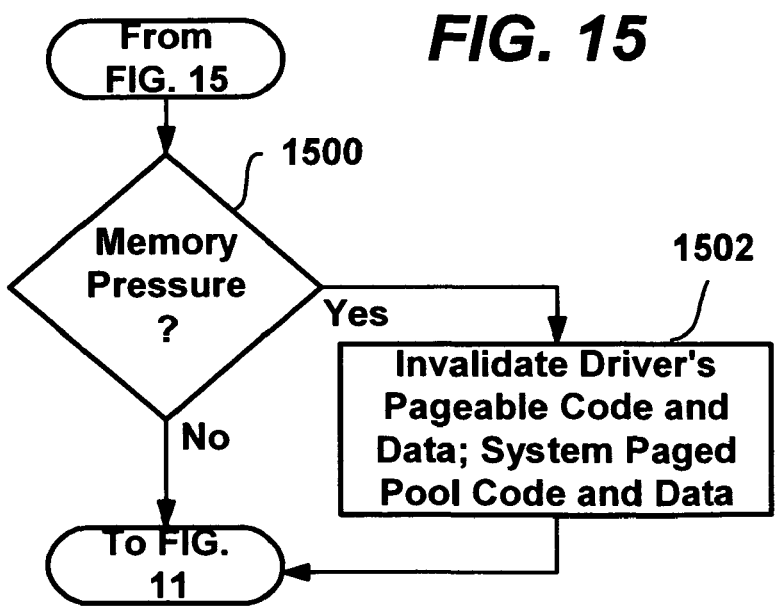
FIGS. 12-15 comprise a flow diagram generally representing tests set up and performed to verify a driver in accordance with an aspect of the present invention.

FIG. 15 next represents the memory pressure test, which if active as determined by step 1500, results in the invalidating (step 1502) of the driver's pageable code and data, and the system paged pool code and data as described above.

Once the various tests are established, the driver verifier 70 can detect driver errors and can issue appropriate bug checks. Table 3 below summarizes errors and bug check values issued therefor:

TABLE 3

| | |
|---|---|
| IRQL_NOT_LESS_OR_EQUAL | 0xA |
| PAGE_FAULT_IN_NONPAGED_AREA | 0x50 |
| ATTEMPTED_WRITE_TO_READONLY_MEMORY | 0xBE |
| SPECIAL_POOL_DETECTED_MEMORY_CORRUPTION | 0xC1 |
| DRIVER_VERIFIER_DETECTED_VIOLATION | 0xC4 |
| DRIVER_CAUGHT_MODIFYING_FREED_POOL | 0xC6 |
| TIMER_OR_DPC_INVALID | 0xC7 |
| DRIVER_VERIFIER_IOMANAGER_VIOLATION | 0xC9 |
| (described below) | |

Figure 16:
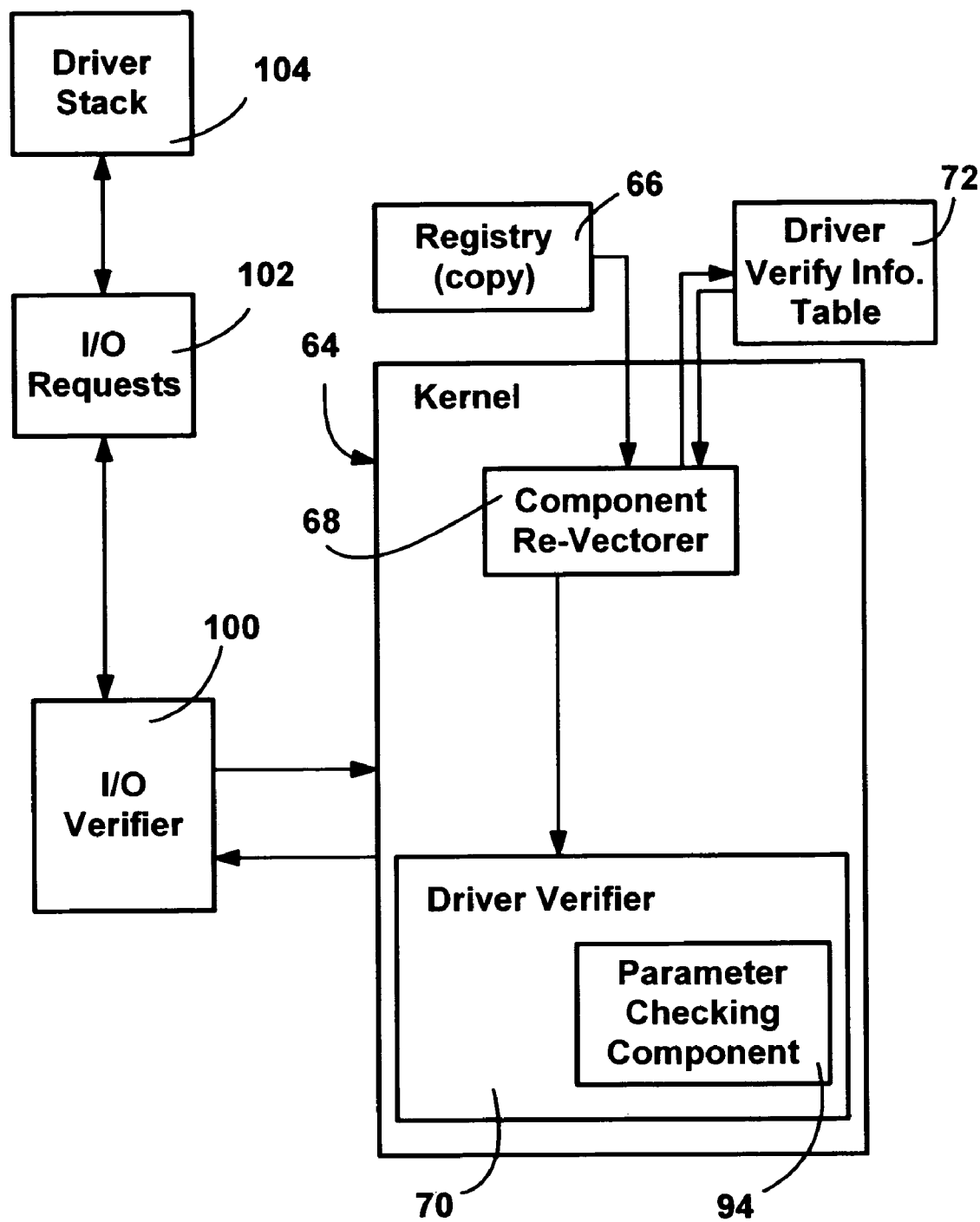
FIG. 16 is a block diagram generally representing verification of I/O requests in accordance with an aspect of the present invention.

Lastly, it can be readily appreciated that the driver verifier 70 further provides a foundation for adding additional features in the future. In general, the driver verifier architecture is directed to making it easier for driver writers to validate their products, for systems to run much more reliably and to provide an easy definitive way to troubleshoot problems when they do occur. One such way in which the present invention may be extended is through an I/O verifier 100 that enables special IRP verification, as generally represented in FIG. 16.

The I/O Verifier

The I/O verifier 100 tests for driver errors wherein I/O is accomplished by sending I/O Request Packets (IRPs) 102 to a stack of drivers 104 managing a particular piece of hardware. The proper handling of IRPs is required for a stable and functional operating system. In general, the I/O verifier 100 operates by activating hooks in the kernel 64 that allow it to monitor the IRP traffic throughout the system. The I/O verifier 100 also changes the manner in which I/O travels throughout the system, setting a series of traps to immediately catch errant behavior.

The I/O verifier 100 hooks functions that drivers call to manipulate IRPs. The functions are set forth in TABLE 4:

TABLE 4

| | |
|---|---|
| IofCallDriver | Sends or forwards an IRP to a driver |
| IofCompleteRequest | Finishes an IRP |
| IoAllocateIrp | These functions create IRPs |
| IoBuildSynchronousFsdRequest | |
| IoBuildAsynchronousFsdRequest | |
| IoBuildDeviceIoRequest | |
| IoFreeIrp | Frees IRP |
| IoInitializeIrp | Initializes IRP |
| IoCancelIrp | Cancels IRP |

In order to monitor the driver stacks 104 that receive IRPs 102 and to catch other bugs, the I/O verifier 100 also hooks the functions set forth in TABLE 5 below:

TABLE 5

| | |
|---|---|
| IoAttachDeviceToDeviceStack | Adds driver to stack that receives IRPs. |
| IoDetachDevice | (removes driver from stack that receives IRPs) |
| IoDeleteDevice | (removes an instantiation of a driver from memory) |
| IoInitializeTimer | (initializes a timer for a given driver stack) |

The manner in which the IO verifier "hooks" these functions depends on whether the kernel 64 makes internal use of the routine. Two methods are available.

In the re-vectoring method, a drivers' requests to get an address for a kernel function at load-time are monitored. If the function and driver are to be hooked, an alternate function is supplied by a re-vectoring component for the driver being verified. Re-vectoring monitors load-time fixups between different components. As such, one disadvantage of re-vectoring is that it does not catch a component's call to itself. However, for certain functions the kernel reliance is not an issue, namely the IoInitializeTimer, IoBuildSynchronousFsdRequest, IoBuildAsynchronousFsdRequest and IoBuildDeviceIoRequest functions. As such, the I/O Verifier 100 hooks these functions via re-vectoring.

The second hooking technique requires the kernel 64 to supply hooks in its own functions, because kernel reliance on the remaining functions is an issue, as the entire lifetime of an IRP needs to be monitored. The second technique is thus used on these other functions, i.e., each function has a special callout available to the I/O Verifier 100.

The lifetime of an IRP starts when the IRP is allocated. Next, the request is written into the IRP and the IRP is sent to a driver 102. That driver either forwards the request to another driver, handles the request entirely within itself, or modifies the request before sending it on to another driver. Note that the request is independent of the call stack, as a driver in the stack 104 may choose to "pend" an IRP, i.e., to tell the initiator of the request that the call will be completed later.

To track IRPs throughout the system, the I/O verifier 100 maintains a set of structures that mirror the various aspects of an IRP. When an IRP is allocated, a tracking structure (IOV_REQUEST_PACKET) is created. This structure tracks the memory that encapsulates the IRP. An IOV_REQUEST_PACKET is "active" whenever the corresponding IRP may be sent to a driver. The IOV_REQUEST_PACKET is "non-active" when the corresponding IRP has been freed, but the trackable aspects of the IRP have not abated. When no trace of the IRP remains in the system, the IOV_REQUEST_PACKET becomes "dead" and the underlying structure is freed.

When the new IRP is sent to a stack, the request therein is noticed. In response, the I/O Verifier 100 creates a structure (IOV_SESSION_DATA) to track it, and attaches it to the IOV_REQUEST_PACKET that corresponds to the IRP. The IOV_SESSION_DATA is "alive" when the request is being processed by drivers. When the request is completed, the IOV_SESSION_DATA is marked "non-active." When the request is completed and all call stacks used to process the request have unwound, the request is marked "dead" and the IOV_SESSION_DATA tracking structure is freed.

The lifetimes of the IOV_REQUEST_PACKET and the IOV_SESSION_DATA are independent. If an IRP is created and immediately freed without ever being sent to a stack, an IOV_SESSION_DATA structure is never created. If the IRP is recycled upon completion of a request of a request, the IOV_REQUEST_PACKET may pick up a new "active" IOV_SESSION_DATA before the old "non-active" IOV_SESSION_DATA transitions to the "dead" state. Alternately, the IRP may be freed immediately upon completion of the request, in which case both the IOV_SESSION_DATA and the IOV_REQUEST_PACKET will be "non-active".

At present, when I/O verifier is enabled for a driver, the I/O verifier 100 detects forty different failures within drivers. These failures may be divided into two levels, in which Level 1 is a subset of Level 2 as set forth in TABLE 6 below:

TABLE 6

Verifier level 1 detects:

1) Drivers calling IoFreeIrp on invalid or freed IRPs.
2) Drivers calling IoFreeIrp on IRPs that are still associated with a thread and thus will be freed when completed.
3) Drivers calling IoCallDriver with invalid or freed IRPs.
4) Drivers calling IoCallDriver with invalid or freed device objects.
5) Drivers having dispatch routines that return at IRQLs other than that at which they were called.
6) Drivers that complete IRPs that were already completed.
7) Drivers that forget to remove cancel routines before completing IRPs.
8) Drivers that complete with −1 or STATUS_PENDING (which is illegal).
9) Drivers that complete IRPs from within their ISRs.
10) Drivers that pass bogus fields to the IoBuild . . . Irp functions.
11) Drivers that reinitialize timer fields.

Verifier level 2 detects the above items and also:

12) Drivers that delete their device objects without first detaching them from the stack.
13) Drivers that detach device objects from a stack when they were never attached to anything in the first place.
14) Drivers that forget to remove cancel routines before forwarding IRPs.
15) Drivers that forward or complete IRPs not currently owned by them.
16) Drivers that copy entire stack locations and inadvertantly copy the completion routine.
17) Drivers that free IRPs currently in use.
18) Drivers that call IoInitializeIrp on IRPs allocated with Quota.
19) Drivers that fail to properly initialize IRP statuses.
20) Drivers that forward IRPs directly to the bottom on a stack.
21) Drivers that respond to IRPs to which they should not respond.
22) Drivers that forward failed IRPs where inappropriate.
23) Drivers that reset IRPs statuses that they should not reset.
24) Drivers that do not handle required IRPs.
25) Drivers that fail to detach their device objects from the stack at the appropriate time
26) Drivers that fail to delete their device objects at the appropriate time
27) Drivers that don't fill out required dispatch handlers
28) Drivers that don't properly handle WMI IRPs
29) Drivers that delete device objects at inappropriate times
30) Drivers that detach their device objects at inappropriate times
31) Drivers that return statuses inconsistent with what the completion routine above them saw.
32) Drivers that return bogus or uninitialized values from their dispatch routines.
33) Drivers that return synchronously but forget to complete an IRP
34) Drivers that set pageable completion routines
35) Drivers that forget to migrate the pending bit in their completion routines
36) Drivers that forget to reference device objects where appropriate.
37) Drivers that complete IRPs without forwarding them where inappropriate.
38) Drivers that incorrectly fill out certain PnP IRPs.
39) Drivers that create IRPs that are reserved for system use only.
40) Drivers that call IoCallDriver at invalid IRQLs, based on the major code.

Many of these checks (e.g., checks numbered 1-9, 11-14, 18, 27 and 40) involve spot checking various fields when a driver calls one of the monitored functions. These checks typically use the re-vectoring technique.

The remainder of the checks depend on complete knowledge of the IRP as it traveled throughout the system. For example, the check numbered 17 detects that an IRP has been freed when in use by checking to see if an IRP has an "active" IOV_SESSION_DATA structure associated with it.

In addition to monitoring I/O, The I/O verifier 100 actively changes the way in which I/O travels throughout the system to flush out errant behavior and make such behavior more-readily detectable.

First, the I/O verifier 100 allocates IRPs from a special pool. As described above, special pool memory may be set by the I/O verifier 100 to detect attempts to access freed memory, and to detect over-writes. Both of these mistakes are common in IRP usage. To this end, when I/O Verifier is enabled (via the bitfield for a driver), all IRPs obtained through IoAllocateIrp are allocated from a special pool and their use is tracked.

Second, when a driver finishes with a request, the memory backing the IRP is typically still valid. Drivers that erroneously touch the IRP after completion may or may not corrupt memory in an easily detectable manner. The use of the special pool alone does not always catch this bug, as the IRP is often recycled instead of freed upon completion. To catch this, the I/O verifier 100 creates a copy of the IRP, called a surrogate, each time the IRP is forwarded. Upon completion of the surrogate, the original IRP is updated and the surrogate is immediately freed. If the surrogate IRP is allocated via special pool, then the above-mentioned bugs are immediately detected. Surrogate IRPs have their own IOV_REQUEST_PACKET tracking data, and the structure refers back to the IOV_REQUEST_PACKET associated with the original IRP.

Third, the driver handling the request may choose to return before the operation is completed. This is called "pending" an IRP. Drivers often send IRPs down their stack and do some processing when the IRP comes back up the stack. However, many fail to wait if the IRP was not handled synchronously (i.e., the IRP is still pending). To catch these bugs the I/O verifier 100 makes the IRPs appear to be handled asynchronously. While doing so, the I/O verifier 100 ensures that the IRP is not accessible, whereby erroneous behavior is immediately detectable.

Fourth, the code at a higher IRQL must finish before code at a lower IRQL is scheduled. IRPs may be completed at any IRQL between zero (0) and two (2). A common bug in drivers is to access pageable memory during completion of an IRP. Such an operation is illegal if the IRP is completed at level two (2). To flush out this type of bug, the I/O verifier 100 can choose to complete all IRPs at any level between 0 and 2.

Fifth, when completing an IRP, a driver must return an identical status in two different places. Drivers often make the mistake of returning two different statuses, one from the driver stack beneath them and one of their own. Unfortunately, such bugs are hard to detect, as typically the stack beneath them will use a matching return code. To flush these bugs out, the I/O verifier 100 may change the returned status of a driver by continually adding one (1) to the code at each layer. This technique is called status rotation.

Sixth, drivers sometimes return uninitialized status codes. In such an event, the code returned is read from a location on the call stack, with a value that is essentially random. Before calling into a driver, the I/O verifier 100 may first pre-initialize future stack locations to a known illegal value. If that value is returned after calling the driver, then this bug is immediately detected.

As can be seen from the foregoing detailed description, there is provided a method and system for monitoring and verifying drivers. The method and system are flexible, efficient, extensible and help detect (and produce) numerous errors in various types of drivers, thereby significantly helping to increase the reliability of a system. Indeed, in actual implementations, computer systems having verified drivers have increased reliability on the order of thirty to forty percent. Moreover, because no re-compilation or changes of any kinds to the target drivers are required (i.e., the driver verifier can take action on unmodified driver binaries), the present invention provides an invaluable tool for system administrators and so forth, (as well as developers), as they can easily verify drivers on existing systems without having to install an entire checked (i.e., debug) build, or indeed, debug components of any type.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for verifying kernel mode drivers within a computing system, the method comprising:
   receiving a request from a kernel mode driver, the request corresponding to a communication directed from the driver to a kernel component of an operating system;
   determining that the kernel mode driver is to be monitored;
   re-vectoring the request to a driver verifier;
   the driver verifier validating one or more call parameters of the request wherein one or more rules are maintained and each of the one or more call parameters are tested against the one or more rules;
   upon finding an invalid parameter, the driver verifier issuing a bug check;
   determining whether the driver is to be tested for random failures;
   upon determining the driver is to be tested for random failures, the driver verifier introducing a failure to the request; and
   the driver verifier testing the kernel mode driver for one or more possible errors by conducting at least one pre-established kernel mode driver test.

2. The method of claim 1 wherein receiving the request from the kernel mode driver includes receiving a function call from the kernel mode driver.

3. The method of claim 1 wherein determining that the kernel mode driver is to be monitored comprises checking a registry setting.

4. The method of claim 1 wherein the request from the kernel mode driver includes a memory allocation request, and wherein taking action in the driver verifier comprises allocating memory space to the kernel mode driver from a special pool of memory.

5. The method of claim 1 wherein the request from the kernel mode driver includes a memory allocation request, and further comprising allocating memory space, wherein testing the kernel mode drive comprises marking memory adjacent the allocated memory space to detect improper access by the kernel mode driver of the marked memory adjacent the allocated memory space.

6. The method of claim 1 wherein the request from the kernel mode driver includes a memory deallocation request, and further comprising, deallocating memory space in response to the request, wherein testing the kernel mode driver includes marking the deallocated memory space to detect improper access by the kernel mode driver of the deallocated memory space.

7. The method of claim 1 wherein testing the kernel mode drive includes maintaining allocation information in at least one data structure associated with the kernel mode driver, including updating the data structure in response to a memory allocation request made by the kernel mode driver.

8. The method of claim 7 wherein maintaining the allocation information includes updating the data structure in response to a deallocation request made by the kernel mode driver.

9. The method of claim 1 wherein testing the kernel mode drive includes checking for resources allocated to the driver at driver unload.

10. The method of claim 1 wherein testing the kernel mode driver includes simulating a low resource condition.

11. The method of claim 10 wherein simulating the low resource condition includes failing requests for memory pool allocation.

12. The method of claim 10 wherein simulating the low resource condition includes invalidating driver code and data.

13. The method of claim 1 wherein testing the kernel mode driver includes checking for timers in deallocated pooled memory.

14. A computer-readable data storage device having computer-executable instructions encoded thereon, which when executed perform the method of claim 1.

15. The computer-readable data storage device of claim 14 having further computer-executable instructions whereby:

the request from the kernel mode driver includes a memory allocation request, and wherein taking action in the driver verifier comprises allocating memory space to the kernel mode driver from a special pool of memory.

16. A system for verifying kernel mode drivers, the system comprising one or more processors and computer memory and further comprising:

a re-vectoring component that receives a request from a kernel mode driver;

a driver verifier operably coupled to the re-vectoring component to receive the request and conduct at least one test to monitor the kernel mode driver with respect to the request;

wherein the driver verifier validates one or more parameters of the request;

wherein one or more rules are maintained and each of the one or more call parameters are tested against the one or more rules;

wherein the driver verifier determine whether the driver is to be tested for random failures; and wherein the driver verifier upon determining the driver is to be tested for random failures, introduce a failure to the request.

17. The system of claim 16 wherein the driver verifier conducts a test for whether the kernel mode driver attempts to access memory space not allocated to the kernel mode driver at the time of the access attempt.

18. The system of claim 16 wherein the at least one test comprises at least one test of a set of possible tests, the set including: a test for whether resources remain associated with the kernel mode driver following kernel mode driver unload, a test that tracks outstanding memory space allocated to the driver; a test that examines resources allocated to the driver; or a test for validating call parameters associated with the request; a test that fails a request from the kernel mode driver for memory pool allocation, a test that invalidates driver code and data, or a test that checks for timers in deallocated pooled memory.

19. The system of claim 16 wherein the driver verifier simulates a low resource condition in response to the kernel mode driver request.

* * * * *

UNITED STATES PATENT AND TRADEMARK OFFICE
CERTIFICATE OF CORRECTION

PATENT NO. : 7,861,121 B2
APPLICATION NO. : 11/479268
DATED : December 28, 2010
INVENTOR(S) : Landy Wang It is certified that error appears in the above-identified patent and that said Letters Patent is hereby corrected as shown below:

In column 18, line 62, in Claim 5, delete "drive" and insert -- driver --, therefor.

In column 19, line 7, in Claim 7, delete "drive" and insert -- driver --, therefor.

In column 19, line 17, in Claim 9, delete "drive" and insert -- driver --, therefor.

Signed and Sealed this
Nineteenth Day of July, 2011

David J. Kappos
*Director of the United States Patent and Trademark Office*